US009525828B2

(12) United States Patent
Won et al.

(10) Patent No.: US 9,525,828 B2
(45) Date of Patent: Dec. 20, 2016

(54) GROUP RECORDING METHOD, MACHINE-READABLE STORAGE MEDIUM, AND ELECTRONIC DEVICE

(71) Applicant: Samsung Electronics Co., Ltd., Suwon-si, Gyeonggi-do (KR)

(72) Inventors: Seol-Hye Won, Seoul (KR); Yang-Don Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 14/257,340

(22) Filed: Apr. 21, 2014

(65) Prior Publication Data

US 2014/0354852 A1 Dec. 4, 2014

(30) Foreign Application Priority Data

Jun. 3, 2013 (KR) .................. 10-2013-0063674

(51) Int. Cl.
*H04N 5/262* (2006.01)
*H04N 5/265* (2006.01)
*H04B 7/26* (2006.01)
*H04N 1/00* (2006.01)

(52) U.S. Cl.
CPC .............. *H04N 5/2628* (2013.01); *H04B 7/26* (2013.01); *H04N 1/00172* (2013.01); *H04N 1/00201* (2013.01); *H04N 5/265* (2013.01)

(58) Field of Classification Search
CPC .. H04N 5/23293; H04N 5/2628; H04N 5/265; H04N 1/00411; H04N 1/00201; H04N 1/00172; H04B 7/26
See application file for complete search history.

(56) References Cited

U.S. PATENT DOCUMENTS

| | | | | |
|---|---|---|---|---|
| 5,164,827 A | * | 11/1992 | Paff | G08B 13/19608 348/143 |
| 7,725,015 B2 | * | 5/2010 | Tanoue | 396/56 |
| 8,260,090 B2 | * | 9/2012 | Ebato | H04N 5/23293 348/333.05 |
| 8,854,484 B2 | * | 10/2014 | Takagi | 348/211.3 |
| 2004/0145660 A1 | * | 7/2004 | Kusaka | 348/211.2 |
| 2005/0036044 A1 | | 2/2005 | Funakura | |
| 2006/0165405 A1 | | 7/2006 | Kanai et al. | |

(Continued)

FOREIGN PATENT DOCUMENTS

EP 2 309 762 A1 4/2011
JP 2007-124378 A 5/2007

(Continued)

*Primary Examiner* — Luong T Nguyen
(74) *Attorney, Agent, or Firm* — Jefferson IP Law, LLP

(57) ABSTRACT

A group recording method for an electronic device is provided. The method includes establishing a connection between the electronic device and at least one other electronic device through wireless communication, acquiring a first image created by photographing a target subject, acquiring a second image created by photographing the target subject from the another electronic device, and concurrently recording by the electronic device the first image and the second image and displaying the first image and the second image together on a display screen, in which a second viewpoint corresponding to the second image is different from a first viewpoint corresponding to the first image.

20 Claims, 14 Drawing Sheets

(56) References Cited

U.S. PATENT DOCUMENTS

| | | | |
|---|---|---|---|
| 2010/0208123 A1* | 8/2010 | Akagi et al. | 348/333.12 |
| 2011/0109726 A1 | 5/2011 | Hwang et al. | |
| 2011/0285864 A1 | 11/2011 | Kashiwa et al. | |
| 2011/0304697 A1* | 12/2011 | Kim et al. | 348/47 |
| 2013/0069188 A1 | 3/2013 | Chen et al. | |

FOREIGN PATENT DOCUMENTS

| | | |
|---|---|---|
| JP | 3937355 B2 | 6/2007 |
| WO | 2008/075635 A1 | 6/2008 |

\* cited by examiner

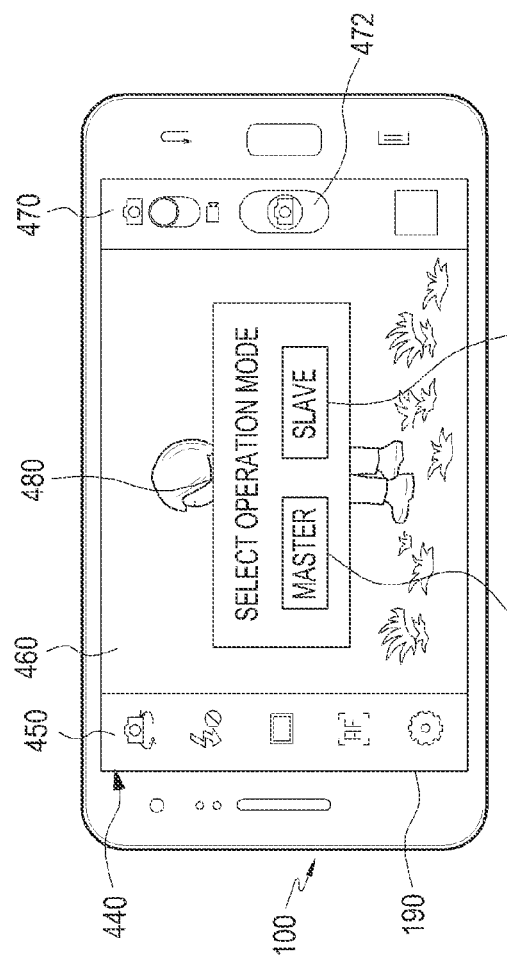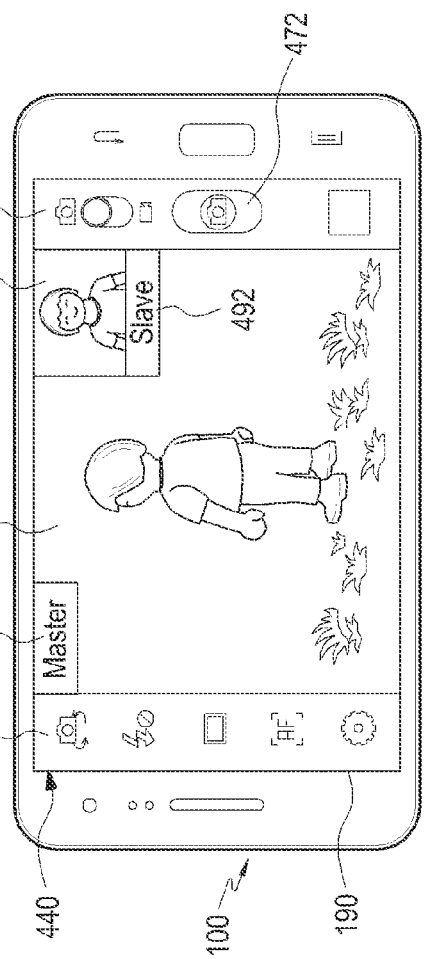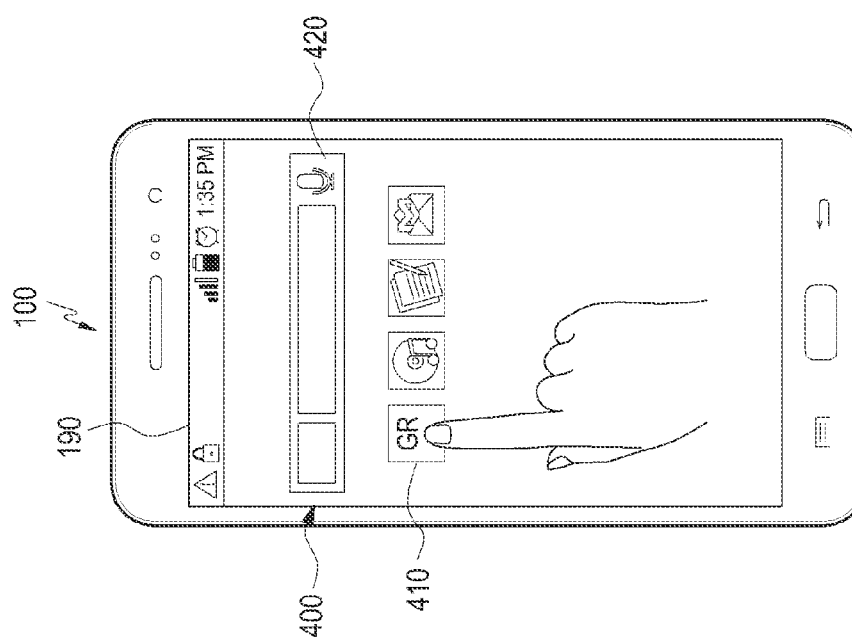

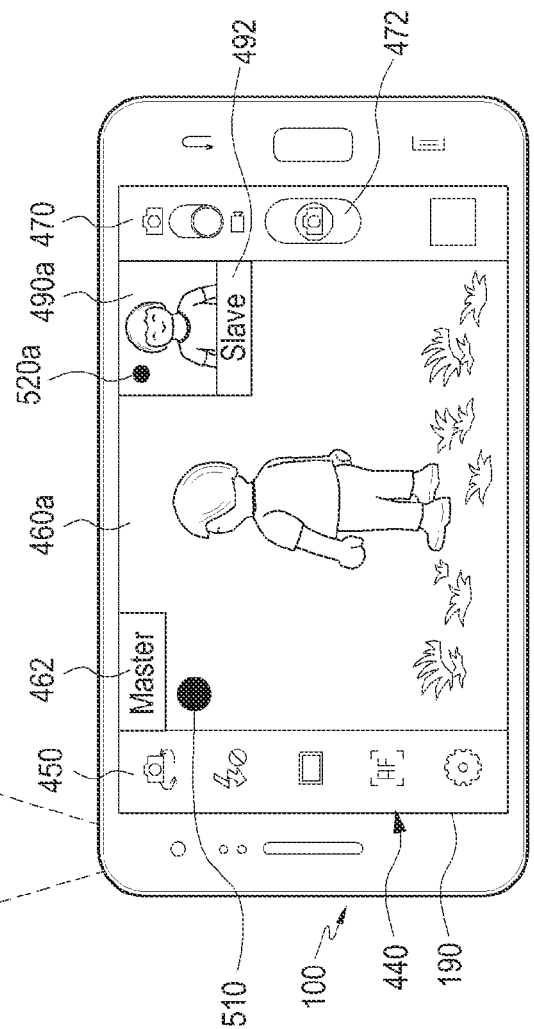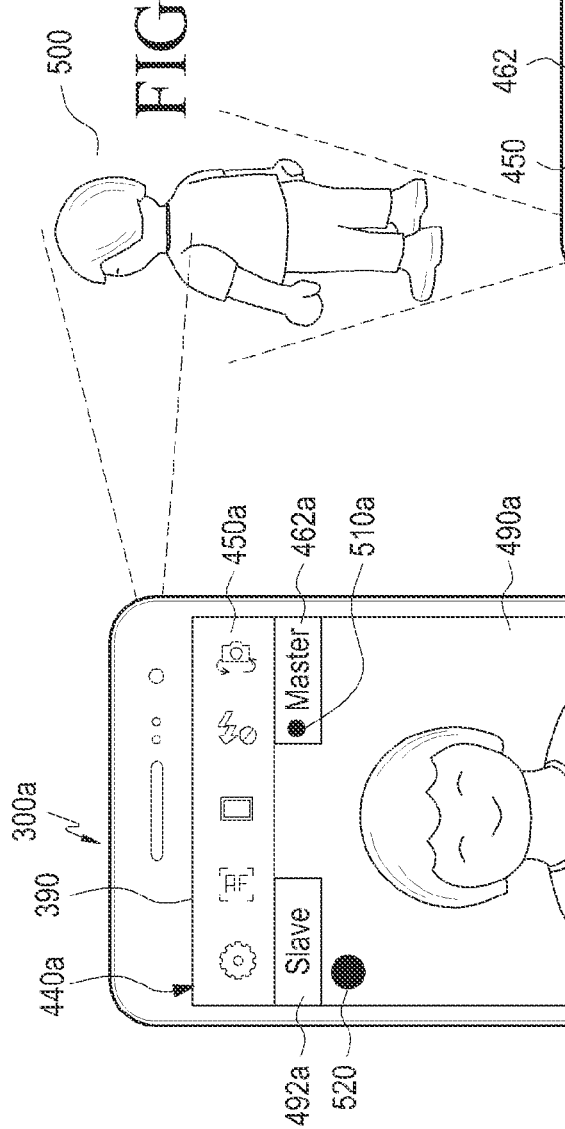

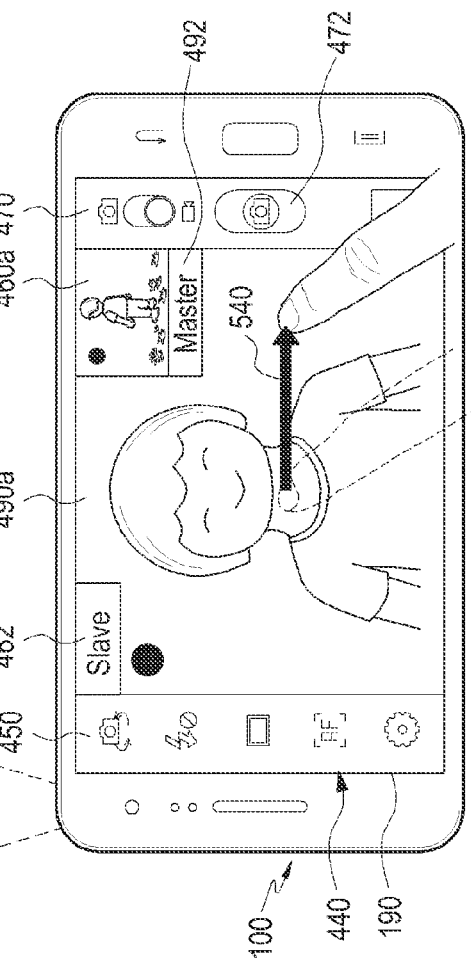
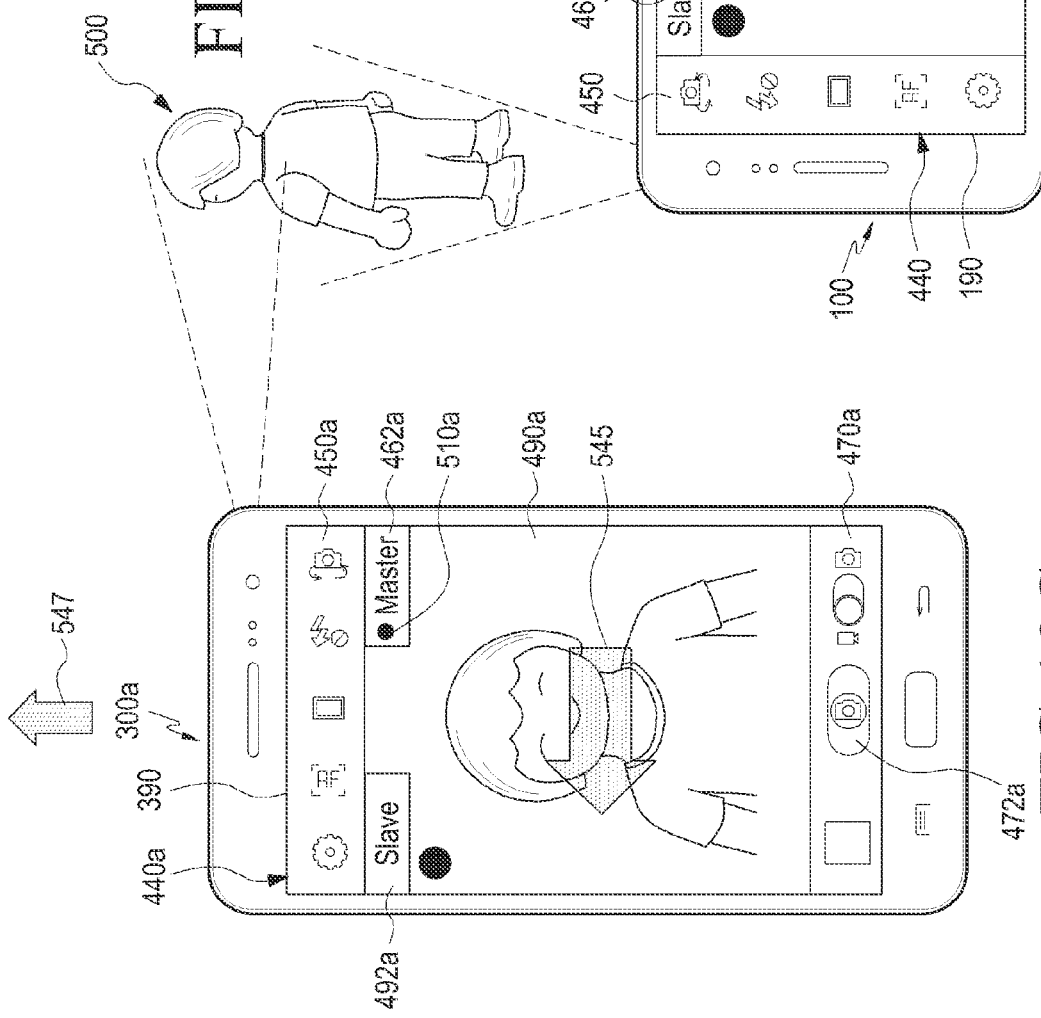

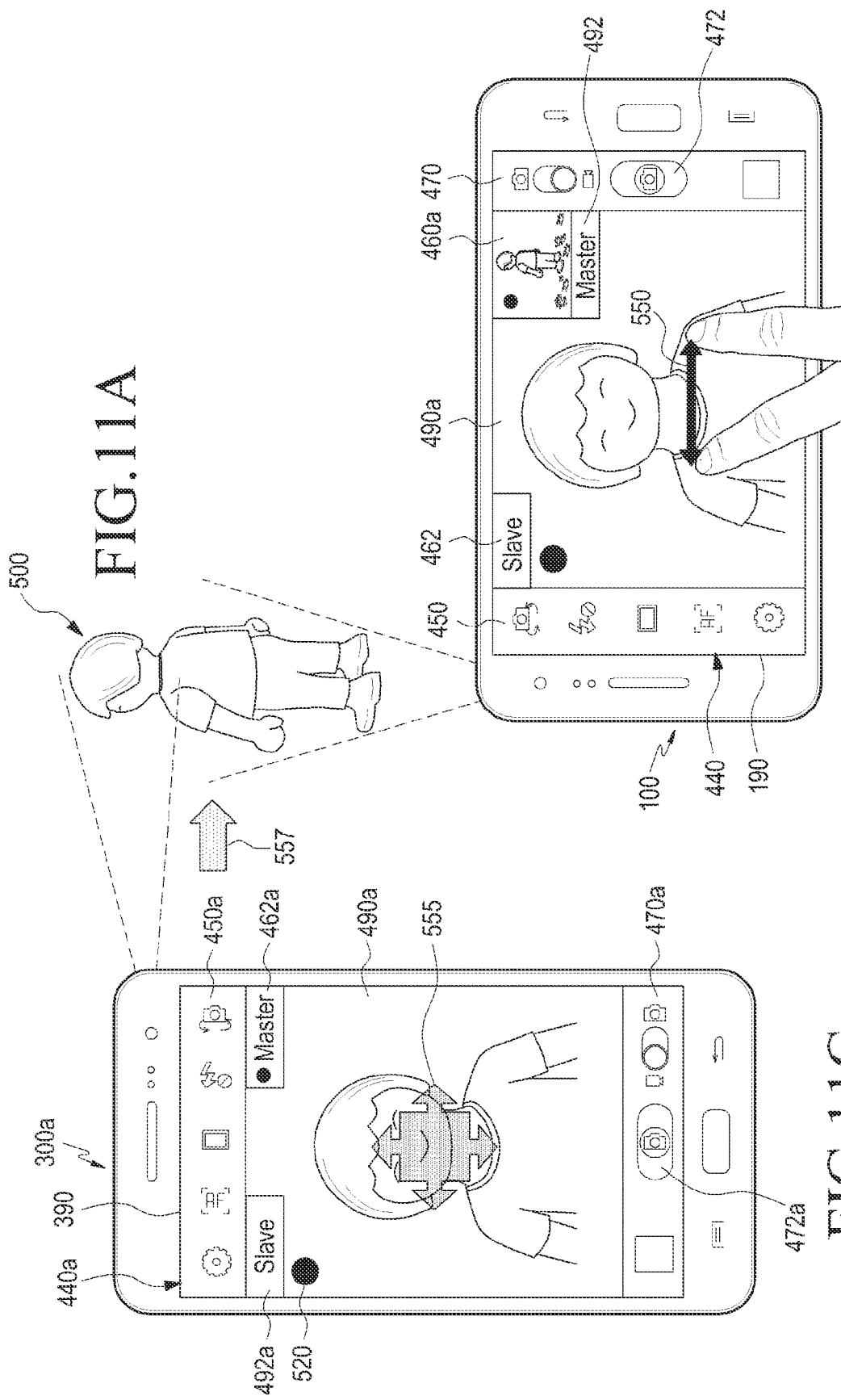

GROUP RECORDING METHOD, MACHINE-READABLE STORAGE MEDIUM, AND ELECTRONIC DEVICE

CROSS-REFERENCE TO RELATED APPLICATION(S)

This application claims the benefit under 35 U.S.C. §119(a) of a Korean patent application filed on Jun. 3, 2013 in the Korean Intellectual Property Office and assigned Serial number 10-2013-0063674, the entire disclosure of which is hereby incorporated by reference.

TECHNICAL FIELD

The present disclosure relates to an electronic device including a camera. More particularly, the present disclosure relates to a method for photographing an object by an electronic device.

BACKGROUND

An electronic device directly controlled by a user includes at least one display device, such that the user may control the electronic device through an input device while watching various operation states or application operations on the display device. In particular, a portable terminal manufactured to be carried with a user, such as a cellular phone, due to its limited size, generally provides a user interface through an input device that allows user's screen touch input, instead of including a directional button for up/down/left/right movement.

The cellular phone of the related art also includes a camera for photographing an object, and typically provides an application for editing an image captured by the camera. By using the application, the user may perform manipulation, such as image cropping.

However, in the related art, if a plurality of users photograph the same object in the same place, a scene or view that may be captured by each electronic device is limited, resulting in a monotonous work having a limited sight.

Moreover, even when a plurality of users carry a plurality of electronic devices equipped with cameras, they may experience difficulties in photographing the same object at various points in time and in sharing images captured by the plurality of electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to enable group photographing of a same object from various viewpoints, thereby allowing the users to acquire dynamic scenes with respect to the object.

In accordance with an aspect of the present disclosure, a group recording method for an electronic device is provided. The group recording method includes establishing a connection with at least one other electronic device through wireless communication, acquiring a first image created by photographing a target subject, acquiring a second image created by photographing the target subject from the at least one other electronic device, and concurrently recording by the electronic device the first image and the second image and displaying the first image and the second image together on a display screen, wherein a second viewpoint corresponding to the second image is different from a first viewpoint corresponding to the first image.

In accordance with another aspect of the present disclosure, an electronic device for group recording is provided. The electronic device includes a camera module configured to acquire a first image by photographing a target subject, a communication module configured to establish a connection with at least one other electronic device through wireless communication, a display unit configured to display a display screen, and a controller configured to receive a second image generated by photographing the subject from the at least one other electronic device through the communication module, to concurrently record by the electronic device the first image and the second image, and to display the first image and the second image together on the display screen, wherein a second viewpoint corresponding to the second image is different from a first viewpoint corresponding to the first image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, 7C, 8A, 8B, 8C, 9A, 9B, 10A, 10B, 10C, 11A, 11B, 11C, 12A, 12B, 13A, 13B, 13C, 14, and 15 are diagrams illustrating a group recording method according to an embodiment of the present disclosure.

Throughout the drawings, like reference numerals will be understood to refer to like parts, components, and structures.

DETAILED DESCRIPTION

Figure 1:
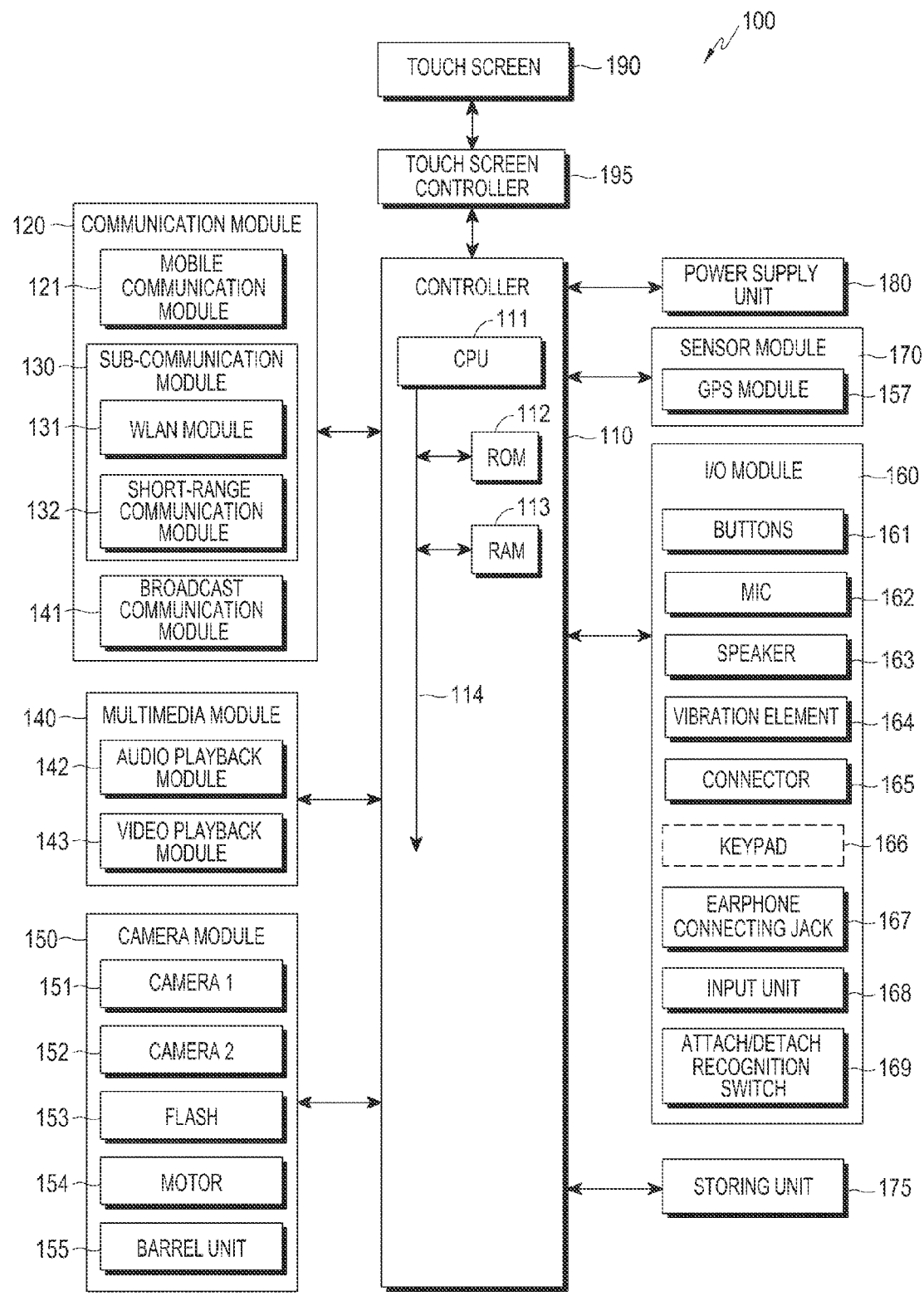
FIG. 1 is a schematic block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components of the present disclosure, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing an embodiment only and is not intended to be limiting of an embodiment. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, unless otherwise indicated herein that the terms are differently defined. It should be understood that terms defined in a generally-used dictionary have meanings coinciding with those of terms in the related technology unless otherwise indicated.

In the present disclosure, an electronic device may be an arbitrary device and may be referred to as a portable terminal, a mobile terminal, a communication terminal, a portable communication terminal, or a portable mobile terminal.

For example, the electronic device may be a smart phone, a cellular phone, a game console, a television (TV), a display, a vehicle head unit, a laptop computer, a tablet computer, a Personal Multimedia Player (PMP), a Personal Digital Assistant (PDA), and/or the like. The electronic device may be implemented with a portable communication terminal having a wireless communication function. The electronic device may also be a flexible display device or a transparent display device.

A representative structure of the electronic device according to an embodiment of the present disclosure may be a cellular phone, and some components may be omitted or changed from the representative structure of the electronic device.

A representative structure of the display device according to an embodiment of the present disclosure may be a TV, and some components may be omitted or changed from the representative structure of the display device.

FIG. 1 is a schematic block diagram illustrating an electronic device according to an embodiment of the present disclosure.

Referring to FIG. 1, an electronic device 100 may be connected with an external electronic device (not illustrated) by using at least one of a communication module 120, a connector 165, and an earphone connecting jack 167. The external electronic device may include one of various devices which are removable from the electronic device 100 and are connectible with the external device 100 in a wired manner, such as, for example, an earphone, an external speaker, a Universal Serial Bus (USB) memory, a charging device, a cradle/dock, a Digital Multimedia Broadcasting (DMB) antenna, a mobile payment-related device, a health management device (a blood pressure monitor and/or the like), a game console, a vehicle navigation device, and so forth. The electronic device may include a wirelessly connectible BLUETOOTH communication device, a Near Field Communication (NFC) device, a WiFi Direct communication device, and a wireless Access Point (AP). The electronic device 100 may be connected with another portable terminal or electronic device such as, for example, one of a cellular phone, a smart phone, a tablet Personal Computer (PC), a desktop PC, and a server, in a wired or wireless manner.

Referring to FIG. 1, the electronic device 100 may include at least one touch screen 190 and at least one touch screen controller 195. The electronic device 100 may also include a controller 110, the communication module 120, a multimedia module 140, a camera module 150, an input/output module 160, a sensor module 170, a storing unit 175, and a power supply unit 180.

The communication module 120 may include a mobile communication module 121, a sub communication module 130, and a broadcast communication module 141.

The sub communication module 130 may include at least one of a Wireless Local Area Network (WLAN) module 131 and a short-range communication module 132. The multimedia module 140 includes an audio playback module 142 and a video playback module 143.

The controller 110 may include a Read Only Memory (ROM) 112 in which a control program for controlling the electronic device 100 may be stored, and a Random Access Memory (RAM) 113 which may store a signal or data input from the electronic device 100 or may be used as a memory region for a task performed in the electronic device 100. A Central Processing Unit (CPU) 111 may include a single core, a dual core, a triple core, or a quad core processor. The CPU 111, the ROM 112, and the RAM 113 may be interconnected through an internal bus 114.

The controller 110 controls the communication module 120, the multimedia module 140, the camera module 150, the input/output module 160, the sensor module 170, the storing unit 175, the power supply unit 180, the touch screen 190, and the touch screen controller 195.

The controller 110 senses a user input generated when a touchable user input means, such as an input unit 168, the user's finger, and/or the like, touches one of a plurality of objects displayed on the touch screen 190, approaches the object, or is disposed in proximity to the object. The controller 110 also identifies the object corresponding to the position on the touch screen 190 where the user input is sensed. The user input generated through the touch screen 190 includes one of direct touch input for directly touching an object and hovering input, which is indirect touch input in which the object is approached within a preset recognizing distance but not directly touched. For example, when the input unit 168 is positioned close to the touch screen 190, an object positioned immediately under the input unit 168 may be selected. In the present disclosure, the user input may include a gesture input generated through the camera module 150, a switch/button input generated through the at least one button 161 or the keypad 166, and a voice input generated through the microphone 162 as well as the user input generated through the touch screen 190.

The object is displayed on the touch screen 190 of the electronic device 100, and includes at least one of, for example, an application, a menu function item, a document, a widget, a picture, a moving image, an e-mail, a Short Message Service (SMS) message, and a Multimedia Messaging Service (MMS) message. The object may be selected, executed, deleted, canceled, stored, and changed using the user input means. The object may be used as a concept including a button, a shortcut icon, a thumbnail image, and a folder including at least one object in the electronic device 100. In the present disclosure, a menu indicates an executable function, for example, an icon, a function item, and/or the like. The function item may be presented in the form of an icon, a text, and/or the like.

The shortcut icon is displayed on the touch screen 190 of the electronic device 100 for quick execution of an application or a call, a contact number, a menu, and so forth. Upon input of a command or a selection for executing the shortcut icon, a corresponding application is executed.

The controller 110 senses a user input event, such as a hovering event, when the input unit 168 approaches the touch screen 190 or is disposed in proximity to the touch screen 190.

Upon occurrence of a user input event with respect to a preset object or in a preset manner, the controller 110 provides a preset vibration effect corresponding to the generated user input event. The vibration effect may be provided corresponding to an input made by a user's finger or the input unit 168.

To provide the vibration effect, the controller 110 outputs a control signal to the input unit 168 or the vibration element 164. The control signal may include information about a vibration pattern. Either the input unit 168 or the vibration element 164 generates a vibration corresponding to the vibration pattern. The information about the vibration pattern may indicate either the vibration pattern or an identifier corresponding to the vibration pattern. The control signal may include a vibration generation request alone.

The electronic device 100 may include at least one of the mobile communication module 121, the WLAN module 131, and the short-range communication module 132.

The mobile communication module 121 may facilitate the connection between the electronic device 100 and an external device through mobile communication by using one or more antennas (not illustrated) under control of the controller 110. The mobile communication module 121 transmits/receives a wireless signal for a voice call, a video call, a text message (SMS), and/or a multimedia message (MMS) with a cellular phone (not illustrated), a smart phone (not illustrated), a tablet PC, or another electronic device (not illustrated) which has a device identification such as a phone number input into the electronic device 100.

The sub communication module 130 includes the WLAN module 131 and the short-range communication module 132. Alternatively, the sub communication module 130 may include either the WLAN module 131 or the short-range communication module 132, or both.

The WLAN module 131 may be connected to the Internet in a place where a wireless AP (not illustrated) is installed, under control of the controller 110. The WLAN module 131 supports the wireless LAN standard IEEE802.11x of the Institute of Electrical and Electronics Engineers (IEEE). The short-range communication module 132 may wirelessly perform short-range communication between the electronic device 100 and an external electronic device under control of the controller 110. The short-range communication may include BLUETOOTH, Infrared Data Association (IrDA), WiFi-Direct communication, NFC communication, and/or the like.

Through the sub communication module 130, the controller 110 may transmit a control signal for a vibration pattern to the input unit 168.

The broadcast communication module 141 receives a broadcast signal (for example, a TV broadcast signal, a radio broadcast signal, or a data broadcast signal) and broadcast additional information (for example, Electronic Program Guide (EPG) or Electronic Service Guide (ESG)) transmitted from a broadcasting station (not shown) via a broadcast communication antenna (not illustrated) under control of the controller 110.

The multimedia module 140 includes the audio playback module 142 or the video playback module 143. The audio playback module 142 may play a digital audio file (for example, a file having a file extension such as '.mp3', '.wma', '.ogg', or '.way') stored in the storing unit 175 or received under control of the controller 110. The video playback module 143 may play a digital video file (for example, a file having a file extension such as '.mpeg', '.mpg', '.mp4', '.avi', '.mov', or '.mky') stored or received under control of the controller 110.

The multimedia module 140 may be integrated into the controller 110.

The camera module 150 may include at least one of the first camera (Camera 1) 151 and the second camera (Camera 2) 152 which capture a still image or a video under control of the controller 110. The camera module 150 may also include at least one of a barrel unit 155 for performing zoom-in/zoom-out operations for photographing, a motor 154 for controlling motion of the barrel unit 155, and a flash 153 for providing an auxiliary light source necessary for photographing. The first camera 151 may be positioned on the front surface of the electronic device 100, and the second camera 152 may be positioned on the rear surface of the electronic device 100. In another embodiment, the first camera 151 and the second camera 152 may be positioned adjacent to each other (for example, a space between the first camera 151 and the second camera 152 may be greater than 1 cm and less than 8 cm) to capture a three-Dimensional (3D) still image or a 3D moving image.

The first camera 151 and the second camera 152 each include a lens system, an image sensor, and so forth. The first camera 151 and the second camera 152 convert an optical signal (input or captured) through the lens systems into an electric image signal and output the electric image signal to the controller 110. The user may capture a moving image or a still image through the first camera 151 and the second camera 152.

The input/output module 160 may include the at least one button 161, the microphone (MIC) 162, the speaker (SPK) 163, the vibration element 164, the connector 165, the keypad 166, the earphone connecting jack 167, and the input unit 168. However, it should be noted that the input/output module 160 is not limited to those examples, and a cursor control such as, for example, a mouse, a track ball, a joy stick, or a cursor direction key may be provided to control movement of a cursor on the touch screen 190.

The buttons 161 may be formed on at least one of a front surface, a side surface, and a rear surface of a housing or case of the electronic device 100, and may include at least one of a power/lock button, a volume button, a menu button, a home button, a back button, and a search button.

The microphone 162 receives voice or sound and generates a corresponding electric signal under control of the controller 110.

The speaker 163 outputs sound corresponding to various signals or data (for example, wireless data, broadcast data, digital audio data, digital video data, and/or the like) under control of the controller 110. The speaker 163 may output sound corresponding to a function executed by the electronic device 100 (for example, button manipulation sound corresponding to a phone call, a ring back tone, or voice of a counterpart user). One or more speakers 163 may be formed in a proper position or proper positions of the housing of the electronic device 100.

The vibration element 164 converts an electric signal into mechanical vibration under control of the controller 110. For example, in the electronic device 100, in a vibration mode, if a voice call or a video call from another device (not illustrated) is received, the vibration element 164 operates. One or more of the vibration element 164 may be disposed in the housing of the electronic device 100. The vibration element 164 may operate in response to user input generated through the touch screen 190.

The connector 165 may be used as an interface for connecting the electronic device 100 with an external device (not illustrated) or a power source (not illustrated). Under control of the controller 110, data stored in the storing unit 175 of the electronic device 100 may be transmitted to an external electronic device or data may be received from the external electronic device through a wired cable connected to the connector 165. The electronic device 100 receives power from the power source through the wired cable connected to the connector 165 or may charge a battery (not illustrated) by using the power source.

The keypad 166 may receive key input from the user for control of the electronic device 100. The keypad 166 may include a physical keypad (not illustrated) formed in the electronic device 100 or a virtual keypad (not illustrated) displayed on the touch screen 190. The physical keypad (not illustrated) formed in the electronic device 100 may be excluded according to the capability or structure of the electronic device 100.

An earphone (not illustrated) may be inserted into the earphone connecting jack 167 to be connected to the electronic device 100.

The input unit 168 may be configured to be inserted into the electronic device 100 for keeping, and when being used, may be configured to be withdrawn or separated from the electronic device 100. In a region of an inner side of the electronic device 100 into which the input unit 168 is inserted, an attach/detach recognition switch 169 is disposed to provide a signal corresponding to attachment or detachment of the input unit 168 to the controller 110. The attach/detach recognition switch 169 may be configured to directly or indirectly contact the input unit 168 when the input unit 168 is mounted. Thus, the attach/detach recognition switch 169 generates the signal corresponding to attachment or separation of the input unit 168 (that is, a signal for indicating the attachment or detachment of the input unit 168) based on whether it contacts the input unit 168, and outputs the signal to the controller 110.

The sensor module 170 includes at least one sensor for detecting a state of the electronic device 100. For example, the sensor module 170 may include at least one of a proximity sensor for detecting the user's proximity with respect to the electronic device 100, an illumination sensor (not illustrated) for detecting an amount of light in the vicinity of the electronic device 100, a motion sensor (not illustrated) for detecting an operation of the electronic device 100 (for example, rotation of the electronic device 100 or acceleration or vibration applied to the electronic device 100), a geo-magnetic sensor (not illustrated) for detecting a geomagnetic orientation by using the Earth's magnetic field, a gravity sensor for detecting a working direction of gravity, an altimeter for measuring an atmospheric pressure to detect an altitude, and a Global Positioning System (GPS) module 157.

The GPS module 157 receives signals from a plurality of GPS satellites (not illustrated) in the Earth's orbit, and calculates a location of the electronic device 100 by using a time of arrival from the GPS satellite (not illustrated) to the electronic device 100.

The storing unit 175 stores a signal or data which is input/output corresponding to operations of the communication module 120, the multimedia module 140, the input/output module 160, the sensor module 170, or the touch screen 190, under control of the controller 110. The storing unit 175 may also store a control program and applications for control of the electronic device 100 and/or the controller 110.

The term "storing unit" may include the storing unit 175, the ROM 112 and the RAM 113 in the controller 110, or a memory card (not illustrated) mounted in the electronic device 100 (for example, a Secure Digital (SD) card or a memory stick). The storing unit 175 may include a non-volatile memory, a volatile memory, a Hard Disk Drive (HDD), or a Solid State Drive (SSD).

The storing unit 175 may also store applications of various functions such as navigation, video communication, games, an alarm application based on time, images for providing a Graphic User Interface (GUI) related to the applications, user information, documents, databases or data related to a group recording method, background images (for example, a menu screen, a standby screen, and so forth), operation programs necessary for driving the electronic device 100, and images captured by the camera module 150. The storing unit 175 is an apparatus or device, such as, for example, a non-transitory computer-readable storage medium. The term "computer-readable storage medium" includes a medium for providing data to the machine to allow the machine to execute a particular function. The storing unit 175 may include non-volatile media or volatile media. Such a medium must be of a tangible type so that commands delivered from the medium can be detected by a physical reader of the machine which reads the commands.

The computer-readable medium may include, but is not limited to, at least one of a floppy disk, a flexible disk, a hard disk, a magnetic tape, a Compact Disc ROM (CD-ROM), an optical disk, a punch card, a paper tape, RAM, a Programmable ROM (PROM), an Erasable PROM (EPROM), and a flash EPROM.

The power supply unit 180 supplies power to one or more batteries disposed in the housing of the electronic device 100 under control of the controller 110. The one or more batteries supply power to the electronic device 100. The power supply unit 180 may also supply power input from an external power source through the wired cable connected with the connector 165 to the electronic device 100. The power supply unit 180 may also supply power, which is wirelessly input from an external power source using a wireless charging technique, to the electronic device 100.

The electronic device 100 includes the touch screen 190 which provides a user graphic interface corresponding to various services (for example, call, data transmission, broadcasting, picture taking) to users.

The touch screen 190 outputs an analog signal, which corresponds to at least one input to the user graphic interface, to the touch screen controller 195.

The touch screen 190 receives at least one user input through a user's body (for example, a finger including a thumb) or the input unit 168 (for example, a stylus pen or an electronic pen).

The touch screen 190 also receives a continuous movement of one touch (that is, a drag input). The touch screen 190 outputs an analog signal corresponding to the received continuous movement of the touch to the touch screen controller 195.

In the present disclosure, a touch may also include a non-contact touch (for example, when the user input means is positioned within a threshold distance of, for example, 1 cm, in which the user input means may be detected without a direct contact with the touch screen 190. The touch may also include a direct contact between the touch screen 190 and a finger or the input unit 168. A threshold distance or interval from the touch screen 190 within which the user input means may be detected may be changed according to the capability or structure of the electronic device 100. In particular, to separately detect a direct touch event based on a contact with the user input means and an indirect touch event (that is, a hovering event), the touch screen 190 may be configured to output different values for values (for example, an analog voltage value or current value) detected in the direct touch event and the hovering event.

The touch screen 190 may be implemented as, for example, a resistive type, a capacitive type, an infrared type, an acoustic wave type, an Electromagnetic Resonance (EMR) type, or a combination thereof.

The touch screen 190 may include at least two touch panels capable of sensing a touch or an approach of a finger or the input unit 168 to receive inputs generated by the finger or the input unit 168. The at least two touch panels provide different output values to the touch screen controller 195. Thus, the touch screen controller 195 differently recognizes the values input from the at least two touch screen panels to identify whether the input from the touch screen 190 is the input generated by the finger or by the input unit 168.

The touch screen controller 195 converts the analog signal received from the touch screen 190 into a digital signal and transmits the digital signal to the controller 110. The controller 110 controls the touch screen 190 by using the digital signal received from the touch screen controller 195. For example, the controller 110 may control a shortcut icon (not illustrated) displayed on the touch screen 190 to be selected or executed in response to a direct touch event or a hovering event. The touch screen controller 195 may be included in the controller 110.

The touch screen controller 195, by detecting a value (for example, an electric-current value) output through the touch screen 190, recognizes a hovering interval or distance as well as a user input position and converts the recognized distance into a digital signal (for example, a Z coordinate), which it then sends to the controller 110. The touch screen controller 195 may also, by detecting the value output through the touch screen 190, detect a pressure applied by the user input means to the touch screen 190, convert the detected pressure into a digital signal, and provide the digital signal to the controller 110.

Figure 2:
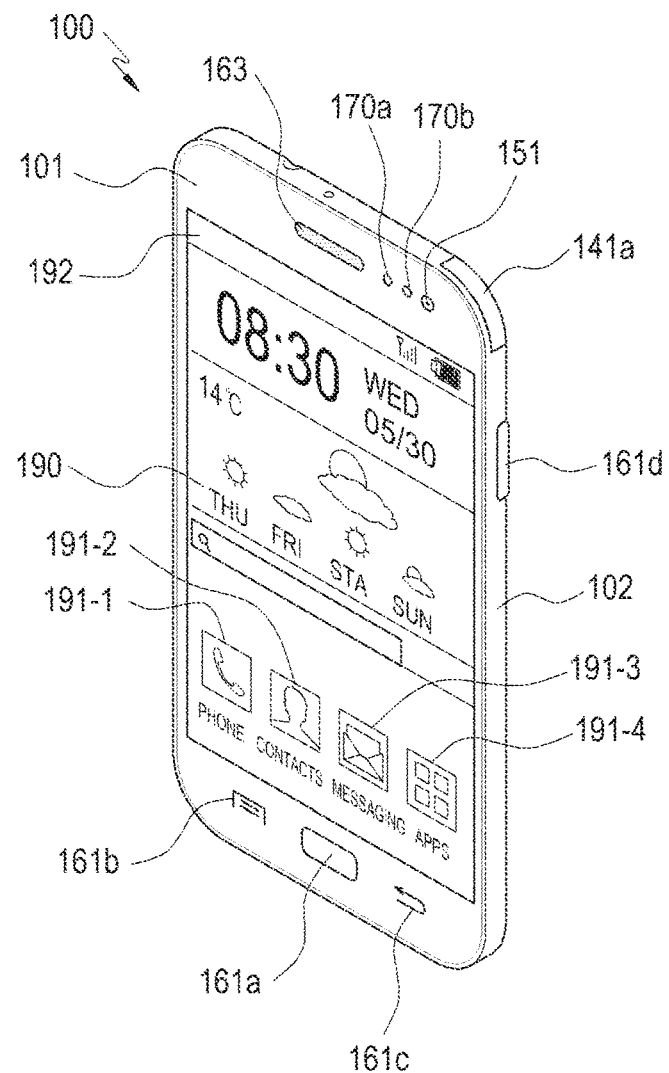
FIG. 2 is a front angle perspective view illustrating an electronic device according to an embodiment of the present disclosure.
Figure 3:
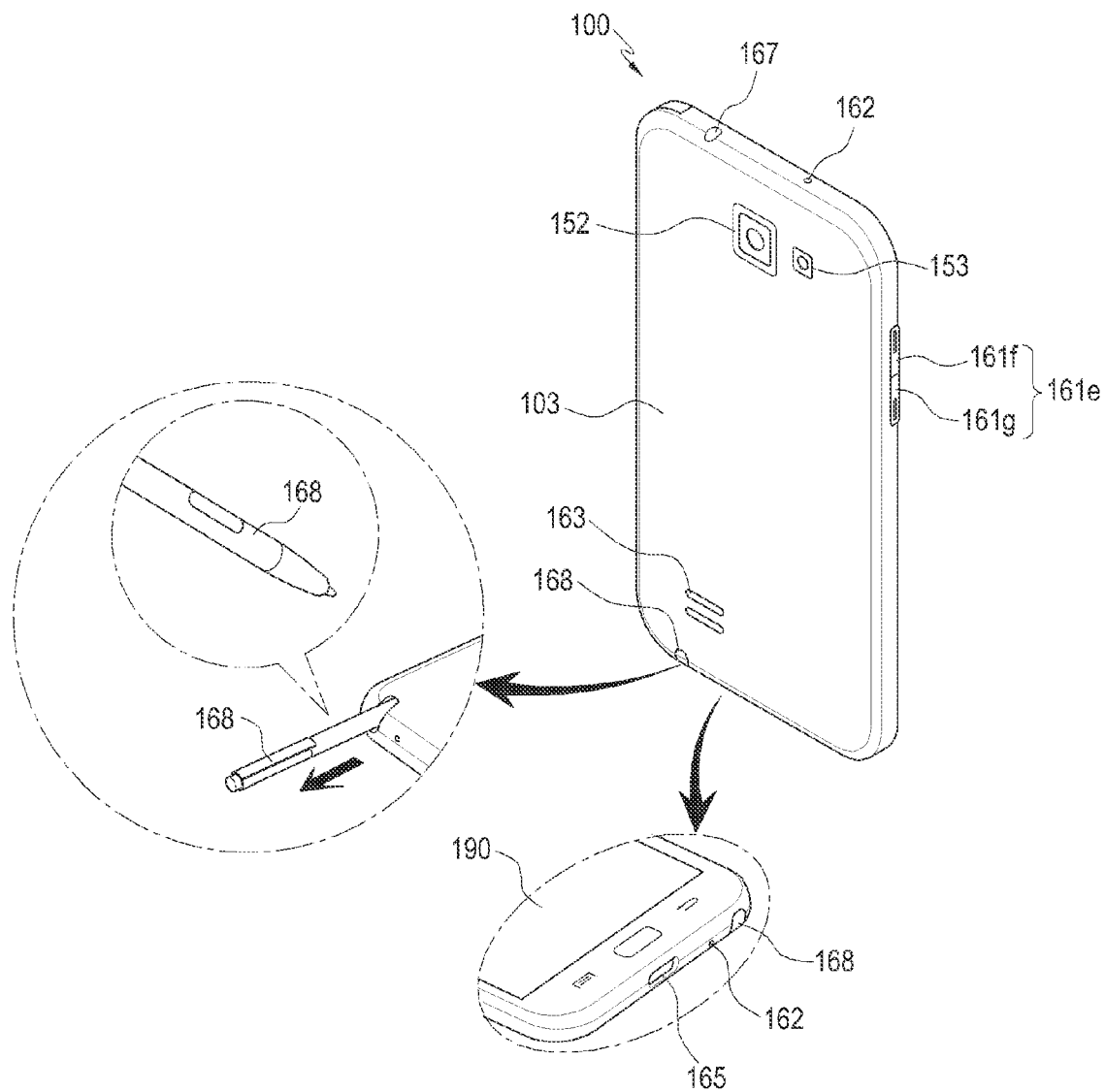
FIG. 3 is a rear angle perspective view illustrating an electronic device according to an embodiment of the present disclosure.

FIG. 2 is a front angle perspective view of an electronic device according to an embodiment of the present disclosure, and FIG. 3 is a rear angle perspective view of an electronic device according to an embodiment of the present disclosure.

Referring to FIGS. 2 and 3, the touch screen 190 is disposed in the center of a front surface 101 of the electronic device 100. The touch screen 190 may be large enough to occupy most of the front surface 101 of the electronic device 100. FIG. 2 shows an example in which a main home screen is displayed on the touch screen 190. The main home screen is an initial screen displayed on the touch screen 190 when the electronic device 100 is powered on. When the electronic device 100 has different home screens of several pages, the main home screen may be the first home screen among the home screens of the several pages. Shortcut icons 191-1, 191-2, and 191-3 for executing frequently used applications, a main menu change key 191-4, time, weather, and so forth may be displayed on the home screen. If the user selects the main menu change key 191-4, a menu screen is displayed on the touch screen 190. A status bar 192 indicating a state of the electronic device 100, such as a battery charge state, a strength of a received signal, and a current time, may be formed in an upper portion of the touch screen 190.

In a lower portion of the touch screen 190, a home button 161a, a menu button 161b, and a back button 161c may be disposed.

The home button 161a is intended to display the main home screen on the touch screen 190. For example, when any home screen, which is different from the main home screen, or a menu screen is displayed on the touch screen 190, the main home screen may be displayed on the touch screen 190 upon selection of the home button 161a. If the home button 161a is selected during execution of applications on the touch screen 190, the main home screen illustrated in FIG. 2 may be displayed on the touch screen 190. The home button 161a may be used to display recently used applications or a task manager on the touch screen 190.

The menu button 161b provides a connection menu which may be displayed on the touch screen 190. The connection menu may include, for example, a widget add menu, a background change menu, a search menu, an edit menu, and an environment setting menu.

The back button 161c may be used to display a screen which was displayed immediately before the currently executed screen or to terminate the most recently used application.

The first camera 151, an illumination sensor 170a, and a proximity sensor 170b may be disposed on an edge of the front surface 101 of the electronic device 100. The second camera 152, the flash 153, and the speaker 163 may be disposed on a rear surface 103 of the electronic device 100.

A power/lock button 161d, a volume button 161e including a volume-up button 161f and a volume-down button 161g, a terrestrial DMB antenna 141a for broadcasting reception, and one or more microphones 162 may be disposed on a lateral surface 102 of the electronic device 100. The DMB antenna 141a may be fixed to or removable from the electronic device 100.

The connector 165, in which multiple electrodes are formed and may be connected with an external device in a wired manner, may be formed in a lower-end lateral surface of the electronic device 100. The earphone connecting jack 167, into which the earphone may be inserted, may be formed in an upper-end lateral surface of the electronic device 100.

The input unit 168, which may be stored by being inserted into the portable terminal 100 and may be withdrawn and separated from the electronic device 100 for use, may be mounted/formed on the lower-end larger surface of the electronic device 100.

Figure 4:
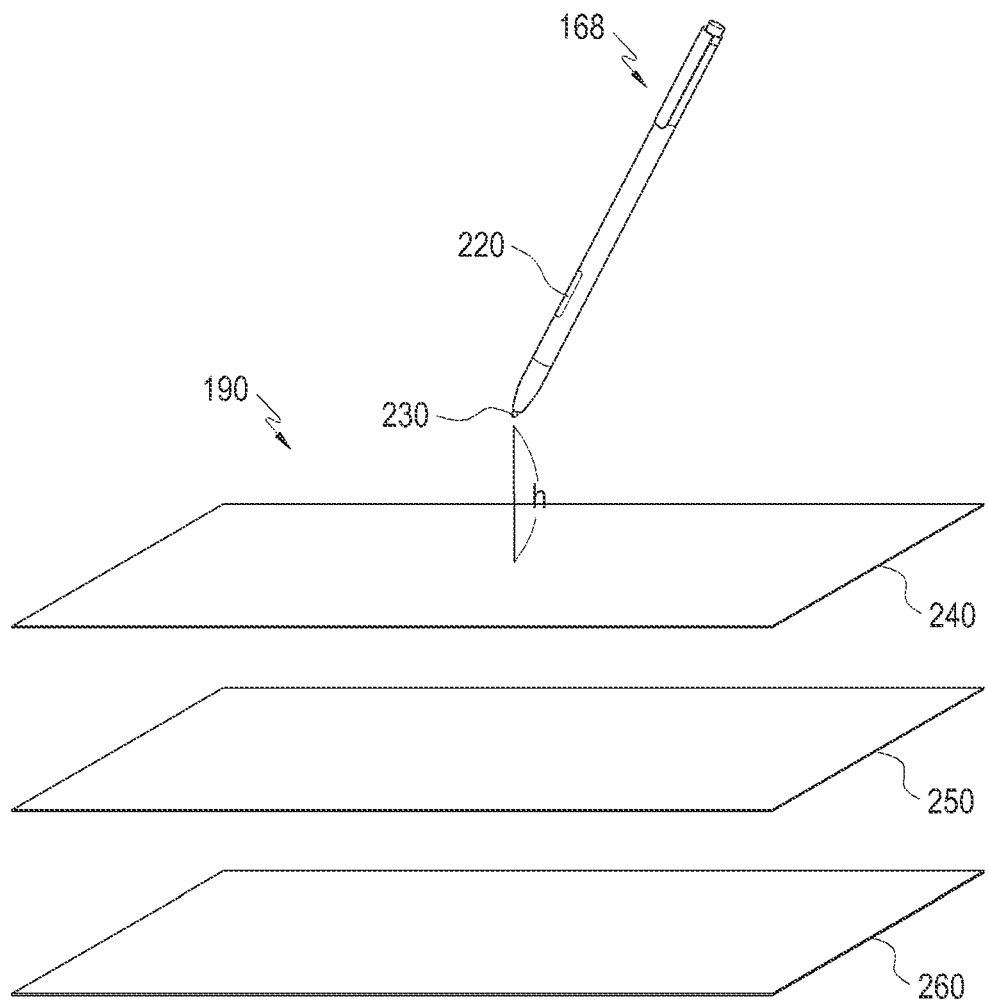
FIG. 4 illustrates a touch screen according to an embodiment of the present disclosure.

FIG. 4 illustrates a touch screen according to an embodiment of the present disclosure.

Referring to FIG. 4, the touch screen 190 includes a first touch panel 240 for sensing a finger input, a display panel 250 for screen display, and a second touch panel 260 for sensing a pen input are sequentially stacked from top to bottom by being closely adhered to one another or partially spaced apart from one another. The first touch panel 240 may also be disposed under the display panel 250.

The display panel 250 includes multiple pixels and displays an image through these pixels. For the display panel 250, a Liquid Crystal Display (LCD), a Light Emitting Diode (LED), or an Organic LED (OLED) may be used. The display panel 250 displays various operation states of the electronic device 100, various images corresponding to execution of applications or services, and a plurality of objects.

The first touch panel 240 may include a window exposed on the front surface of the electronic device 100 and a sensor layer attached to a bottom surface of the window to recognize information (for example, position, strength, and/or the like) of the finger input. The sensor layer forms a sensor for recognizing a position of a finger contact on the surface of the window, and to this end, the sensor layer has preset patterns. The sensor layer may have various patterns such as, for example, a linear latticed pattern, a diamond-shape pattern, and so forth. To perform a sensor function, a scan signal having a preset waveform is applied to the sensor layer, and if the finger contacts the surface of the window, a sensing signal whose waveform is changed by a capacitance between the sensor layer and the finger is generated. The controller 110 analyzes the sensing signal, thereby recognizing whether and where the finger contacts the surface of the window.

In an embodiment, the first touch panel 240 may be a panel which is manufactured by: a) coating a thin metallic conductive material (for example, an Indium Tin Oxide (ITO) layer, and/or the like) onto surfaces of the window to allow electric current to flow on the surface of the window, and b) coating a dielectric, which is capable of storing electric charges, onto the coated surfaces. Once the finger touches the surface of the first touch panel 240, a predetermined amount of electric charge moves to the touched position, and the first touch panel 240 recognizes the amount of change of current corresponding to movement of the electric charge, thus sensing the touched position.

Any type of touches capable of generating electric charge may be sensed through the first touch panel 240.

The second touch panel 260 may be a touch panel of an EMR, and may include an electronic induction coil sensor having a grid structure in which a plurality of loop coils intersect one another and an electronic signal processor for sequentially providing an alternating current signal having a predetermined frequency to the respective loop coils of the electronic induction coil sensor. If the input unit 168 having a resonance circuit embedded therein is brought near the loop coil of the second touch panel 260, a signal transmitted from the loop coil generates electric current based on mutual electromagnetic induction in the resonance circuit of the input unit 168. Based on the electric current, the resonance circuit of the input unit 168 generates and outputs an induction signal. Then, the second touch panel 260 detects the induction signal by using the loop coil, thus sensing an input position (that is, a hovering input position or a direct touch position) of the input unit 168. The second touch panel 260 may also sense a height h from the surface of the touch screen 190 to a pen point 230 of the input unit 168. The induction signal output from the input unit 168 may be activated by a user selection input 220 and may have a frequency which varies according to a pressure applied by the input unit 168 to the surface of the touch screen 190. Based on the frequency, the pressure (that is, a pen pressure) of the input unit 168 may be sensed.

An input means capable of generating electric current based on electromagnetic induction may be sensed through the second touch panel 260.

The present disclosure provides a group recording method for the electronic device 100.

The controller 110 controls the overall operation of the electronic device 100. The controller 110 controls other components of the electronic device 100 to perform a group recording method. Recording means photographing and storing an object.

In a group recording method for an electronic device according to the present disclosure, one of a plurality of electronic devices may be configured as a master device and the other electronic devices may be configured as slave devices.

Figure 5:
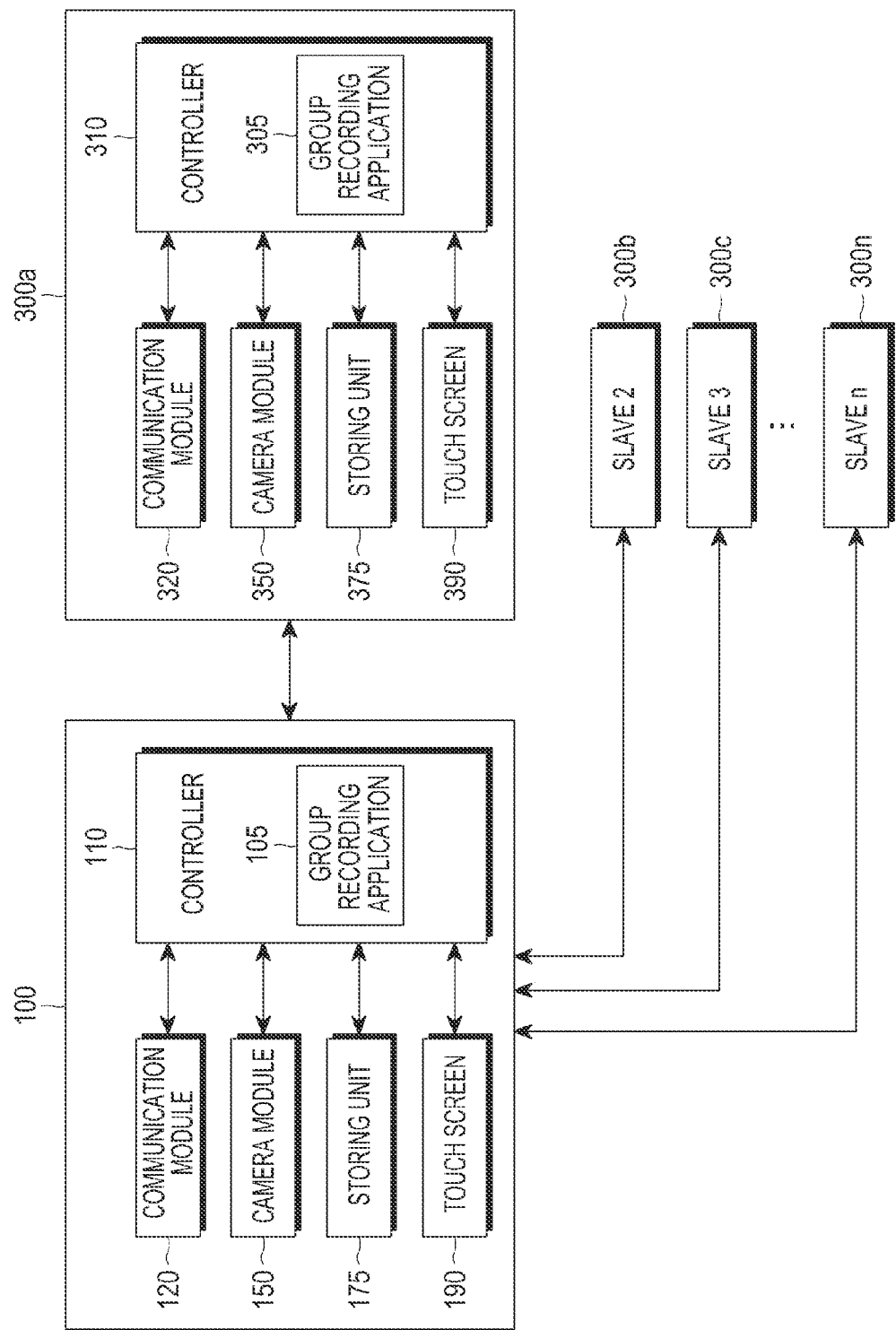
FIG. 5 is a diagram illustrating a plurality of electronic devices that perform group recording according to an embodiment of the present disclosure.

FIG. 5 is a diagram illustrating a plurality of electronic devices that perform group recording according to an embodiment of the present disclosure.

In this example, the electronic device 100 illustrated in FIG. 1 serves as a master device and at least one other electronic devices 300a-300n are wirelessly connected to the master device as slave devices. The illustrated plurality of slave devices 300a-300n may have the same structure as the master device, respectively. Hereinafter, the first another electronic device 300a will be described as a representative slave device. As stated above, some components may be omitted or changed from the representative structure of the electronic device 100.

FIG. 5 shows main components of each device, and the slave device 300a may include a communication module 320, a camera module 350, a storing unit 375, a touch screen 390, and a controller 310.

More specifically, the slave device 300a may include the controller 310 that corresponds to the controller 110 of the master device 100 and controls the overall operation of the slave device 300a, the communication module 320 that corresponds to the communication module 120 of the master device 100 and performs communication with an external device, the camera module 350 that corresponds to the camera module 150 of the master device 100, photographs a surrounding background and an object, and outputs a corresponding image, the storing unit 375 that corresponds to the storing unit 175 of the master device 100 and stores data, and the touch screen 390 that corresponds to the touch screen 190 of the master device 100 and displays the screen.

Corresponding components execute similar functions and thus the components of the slave device 300a will not be described in detail.

In the following description, it should be understood that when each device performs an operation, a controller included in the device controls other components to perform the operation. Data generated in each device and data received from an external device may be stored in a storing unit of the device. It should be also understood that in view of a description of an operation of each component in each device, an operation performed by a controller is performed using the component. For example it should be understood that, communication with an external device is performed using a communication module, data display is performed using a touch screen, and sensing of an event or a surrounding environment is performed using a sensor module.

Figure 6:
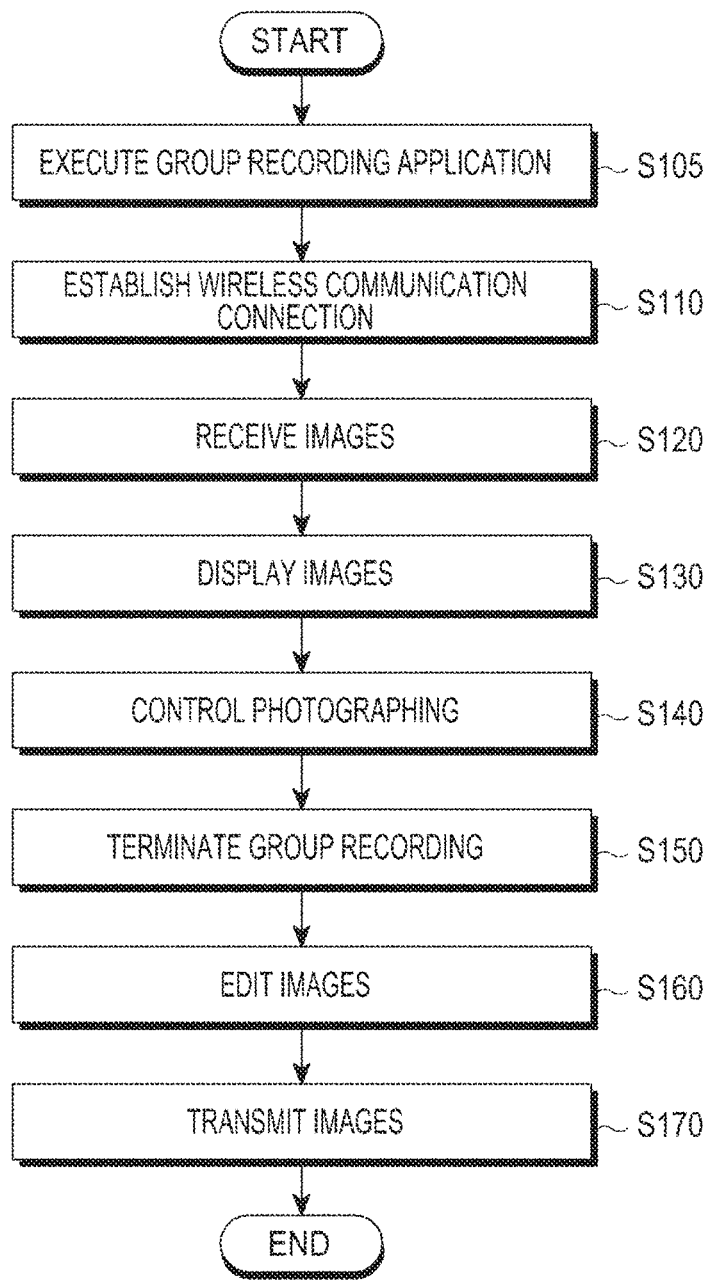
FIG. 6 is a flowchart illustrating a group recording method according to an embodiment of the present disclosure.

FIG. 6 is a flowchart illustrating a group recording method according to an embodiment of the present disclosure.

Referring to FIG. 5, the first other electronic device 300a will be described as a representative slave device, but a description of the slave device 300a may be applied to the other slave devices 300b-300n.

In operation S105 a group recording application is executed in which users execute the same group recording applications 105 and 305 installed respectively in the master device 100 and the slave device 300a.

In operation S110 a wireless connection operation is executed in which the master device 100 and the slave device 300a establish a wireless communication connection there between. The wireless communication connection may be established using the communication modules 120 and 320 that support wireless communication protocols, such as WiFi (IEEE 802.11x), WiFi Direct, infrared rays, ZIGBEE, NFC, Radio-Frequency Identification (RFID), BLUETOOTH, Ultra Wideband (UWB), or the like.

Wireless connection may be initiated by automatic device searching performed by the master device 100 and the slave device 300a, or by user's execution of the same group recording applications 105 and 305 installed in the master device 100 and the slave device 300a.

A master/slave setting between electronic devices may be automatically or manually performed by, for example, menu selection of a group recording application, an environment setting, a default setting, or the like.

In operation S120 an image reception operation is executed in which the master device 100 receives second images captured by the slave device 300a on a real time basis.

A real-time image or an image for real-time transmission or reception indicates a currently captured image like, for example, a video call. That is, real-time transmission of an image refers to immediate transmission of a currently captured image to a counterpart.

The second images received from the slave device 300a may be preview images (i.e., live preview images or real-time preview images) or recording images such as still images or video images. The still images and the video images are high-resolution and high-quality images captured by the slave device 300a in response to a recording command of a second user or the master device 100 and stored as image files in the slave 300a, and the preview images are images captured by the slave device 300a and automatically displayed on the touch screen 390 of the slave device 300a. The preview images are low-resolution and low-quality images that are not stored in the slave device 300a.

The master device 100 and the slave device 300a photograph the same object from different viewpoints, and initiation and termination of recording of the same object by each of the master device 100 and the slave device 300a may be performed by selection or pressing of a photograph button, a mechanical shutter, or a mechanical button displayed or provided on each of the master device 100 and the slave device 300a.

For example, when receiving an image of an object photographed by the master device 100, the slave device 300a may recognize the object the master device 100 is photographing.

For example, the slave device 300a may receive a preview image from the master device 100 and display the received preview image, and a user of the slave device 300a may see the object that the master device 100 is photographing.

When the master device 100 and the slave device 300a are located in proximity to each other, they may share a photographing target (that is, an object) through user's voice or eyesight, and voice information for sharing the object may be delivered through the communication modules 120 and 320 of the master device 100 and the slave device 300a. A message for sharing the object may be delivered through the communication modules 120 and 320 of the master device 100 and the slave device 300a.

The slave device 300a may receive a recording image from the master device 100 and display the received recording image, and a user of the slave device 300a may recognize initiation of recording by the master device 100 and initiate recording by the slave device 300a.

In operation S130 an image display operation is executed in which the master device 100 displays the second images received from the slave device 300a on the touch screen 190.

The master device 100 may display one or all of first real-time images captured by the master device 100 and second real-time images received from the slave device 300a on the touch screen 190 according to user's selection.

In operation S140 a photographing control operation is executed in which the master device 100 receives an input of a first user associated with control of photographing by the slave device 300a and transmits photographing control information corresponding to the first user input to the slave device 300a.

For example, the first user may input a touch gesture or a drag moving in a direction detected on the touch screen 190 when a real-time recording image captured by the slave device 300a is displayed on the touch screen 190. The master device 100 may transmit photographing control information indicating the direction of the input touch gesture to the slave device 300a.

The slave device 300a may perform an operation corresponding to the photographing control information. For example, the slave device 300a may display an arrow corresponding to photographing control information on the touch screen 390.

When a real-time preview image captured by the slave device 300a is displayed on the touch screen 190, the master device 100 may transmit a photographing initiation command to the slave device 300a, and the slave device 300a may automatically initiate image recording, or display information corresponding to the photographing initiation command on the touch screen 390.

In operation S150 a group recording termination operation is executed in which the master device 100 terminates recording according to a command of the first user or automatic setting such as timer expiration.

Group recording may be initiated in any one of operations S120 to S140, and group recording refers to an operation in which the master device 100 and the slave device 300a photograph the same object at the same point in time and store corresponding images. The master device 100 controls group recording overall. Group recording may be terminated by termination of recording by the master device 100 and/or the slave device 300a.

For example, the master device 100 may transmit a photographing termination command to the slave device 300a when a recording image captured by the slave device 300a is displayed on the touch screen 190. The slave device 300a may then automatically terminate image recording or display information corresponding to the photographing termination command on the touch screen 390.

The master device 100 stores first recording images of the master device 100 and second recording images of the slave device 300a as first and second recording files in the storing unit 175, respectively, in response to termination of group recording. The recording file may be a general video file.

In operation S160 an image editing operation is executed in which the master device 100 edits the first recording images and the second recording images on a time basis to generate a single group recording file.

For example, in response to a first user's edit command or in response to termination of group recording, the master device 100 may arrange the first and second recording images on the touch screen 190 in time order. The first user may select the first recording images and the second recording images on a time basis and generate and store a group recording file including the selected images. The master device 100 may also generate and store the first recording images of the master device 100 and the second recording images of the slave device 300a as separate recording files in the storing unit 175 in response to termination of group recording.

In operation S170 an image transmission operation is executed in which the master device 100 transmits the group recording file, the first recording images, or the separate recording file to the slave device 300a. After the master device 100 transmits the group recording file and/or the first recording images to a server, the slave device 300a may receive the group recording file, the first recording images, or the separate recording file from the server. The slave device 300a may play the received group recording file, first recording images, or separate recording file.

FIGS. 7A to 15 are diagrams for describing a group recording method according to an embodiment of the present disclosure.

Referring to FIG. 7A, the storing unit 175 of the electronic device 100 stores a group recording application 410, a voice recognition application 420, and so forth, and the electronic device 100 displays applications such as the group recording application 410, the voice recognition application 420, and so forth in the form of executable icons on a screen 400 of the touch screen 190. Once the group recording application 410 is executed by the first user input, the electronic device 100 executes the group recording method according to an embodiment of the present disclosure.

The electronic device 100 may detect various first user inputs received through the camera module 150, the input/output module 160, and the sensor module 170 as well as through the touch screen 190. The first user input may include information in various forms input to the electronic device 100, such as a gesture, a voice, pupil movement, and a bio signal of the first user as well as a touch gesture. The controller 110 may control a predetermined operation or function corresponding to the detected user gesture to be performed in the electronic device 100.

Referring to FIG. 7B, as the user executes the group recording application 410, a group recording application screen (or a group recording application window) 440 may be displayed on the touch screen 190 of the electronic device 100. On the group recording application screen 440, a first menu bar 450, a second menu bar 470, and a preview image 460 may be displayed. A corresponding group recording application screen 440a may be displayed on the touch screen 390 of the slave device 300a. The preview image 460 in this example shows a child who is a subject. The preview image 460 is a low-resolution (or low-pixel-number) image, and a recording image captured and stored by selecting a photographing button 472 is a high-resolution (or high-pixel-number) image.

The first menu bar 450 includes an environment setting menu, and the second menu bar 470 includes the photographing button 472. A corresponding first menu bar 450a and second menu bar 470a including the photographing button 472a may be displayed on the touch screen 390 of the slave device 300a.

As the group recording application 410 is executed, a window 480 inquiring an operation mode may be displayed on the touch screen 190. That is, the group recording application 410 may operate selectably as a master mode or a slave mode.

Once the first user selects a master button 482, the electronic device 100 operates as a master device, and if the user selects a slave button 484, the electronic device 100 operates as a slave device. In this example, the user selects the master button 482.

Referring to FIG. 7C, as the electronic device 100 operates as the master device, the first preview image 460 captured by the master device 100 and a second preview image 490 captured by the slave device 300a are displayed on the touch screen 190. The first preview image 460 and the second preview image 490 are real-time videos.

For example, the master device 100 may photograph the subject from a side viewpoint to provide the first preview image 460, and the slave device 300a photographs the subject from a front viewpoint in a close range to provide the second preview image 490.

The slave device 300a transmits the second preview image 490 to the master device 100, and the master device 100 displays the first preview image 460 on the touch screen 190 and overlappingly displays the second preview image 490 on an upper-right portion of the first preview image 460.

The position or size of the second preview image 490 may be changed, and for example, the first user may move the second preview image 490 to a position on the touch screen 190 or may change the size of the second preview image 490, through a touch gesture of the first user. When the master device 100 is connected with a plurality of slave devices, a plurality of preview images received from the plurality of slave devices may be displayed on the touch screen 190. If the number of preview images received from the plurality of slave devices exceeds a predetermined number, the preview images may be switched for display through a tough gesture of the first user. For example, when first through fourth slave devices are connected to the master device 100 and first through third preview images of the first through third slave devices are displayed, if the user makes a tough gesture such as a drag, the second through fourth preview images of the second through fourth slave devices or the first, second, and fourth preview images of the first, second, and fourth slave devices may be displayed.

As illustrated in FIG. 7C, indicators for identifying the first preview image 460 and the second preview image 490, for example, a master indicator 462 and a slave indicator 492 may be displayed on the touch screen 190 of the master device 100.

FIG. 8A shows photographing a subject 500 according to an embodiment of the present disclosure.

Referring to FIG. 8B, if the first user presses the photographing button 472, a first recording image 460a photographed by the master device 100 and a second recording image 490a photographed by the slave device 300a are displayed on the touch screen 190.

On the touch screen 190 of the master device 100, the master indicator 462, the slave indicator 492, a first recording indicator 510 indicating that the master device 100 is in a recording state, and a second recording indicator 520a indicating that the slave device 300a is in the recording state may be displayed.

The master device 100 may include as many codecs as the separate images 460a and 490a to process the separate images 460a and 490a. The codecs perform image compression or decompression. The master device 100 may include one codec capable of processing the separate images 460a and 490a in parallel.

Referring to FIG. 8C, if the second user presses a photographing button 472a, the second recording image 490a captured by the slave device 300a is displayed on the touch screen 390.

On the touch screen 390 of the slave device 300a, a master indicator 462a, a slave indicator 492a, a first recording indicator 510a indicating that the master device 100 is in the recording state, and a second recording indicator 520 indicating that the slave 300a is in the recording state may be displayed.

Figure 9A:
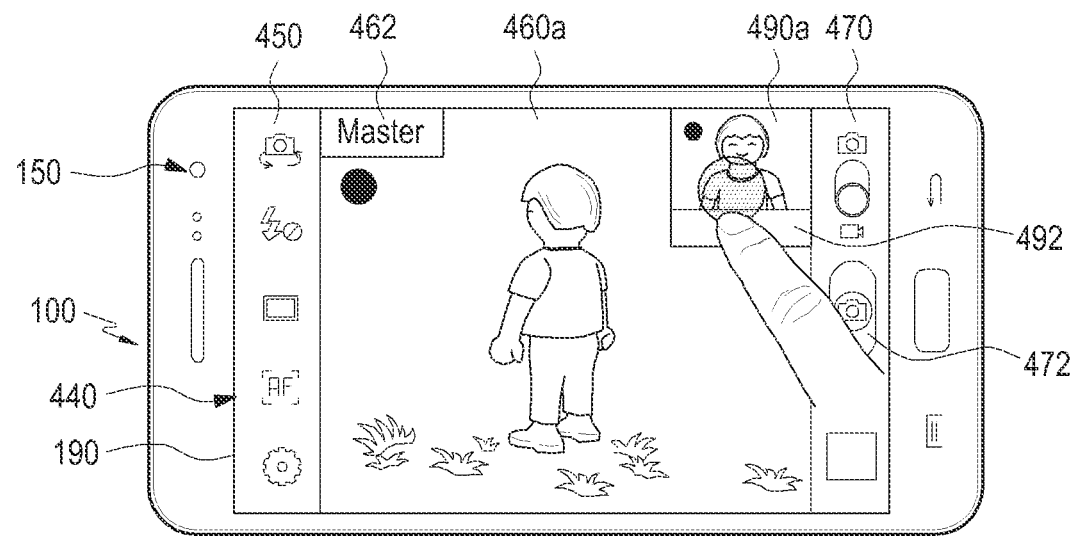

Referring to FIG. 9A, the first recording image 460a is displayed large as a main image, and the second recording image 490a is displayed small as a sub image, and in this case, for example, if the first user selects the second recording image 490a with a finger, the master device 100 may perform screen switchover. In this example, the second recording image 490a is selected with the finger, but the first user may also select the second recording image 490a by using a touchable user input means such as the finger.

Figure 9B:
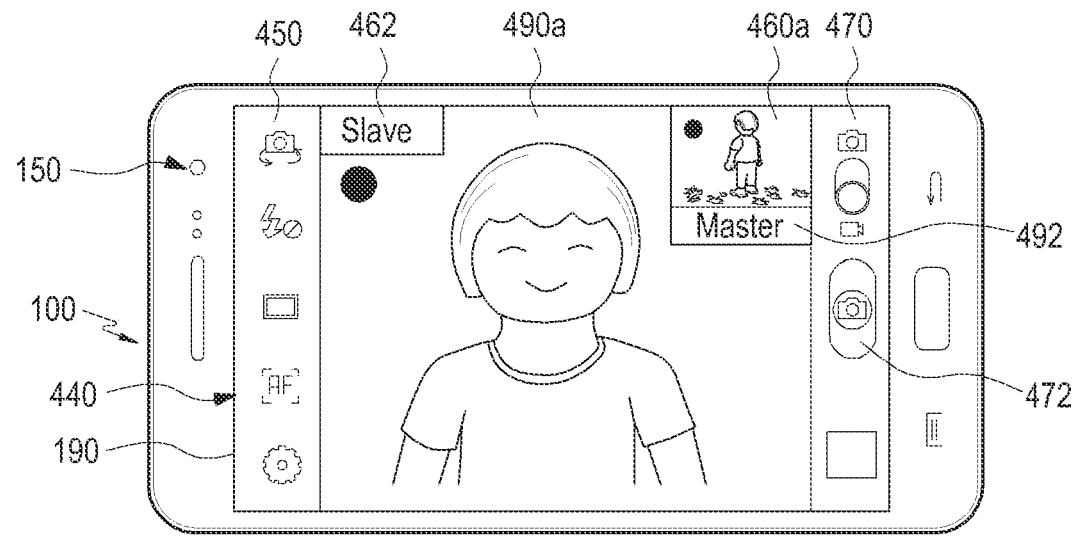

Referring to FIG. 9B, after screen switchover, the first recording image 460a is displayed small as a sub image and the second recording image 490a is displayed large as a main image on the touch screen 190 of the master device 100.

FIG. 10A shows a photographing of the subject 500 according to an embodiment of the present disclosure.

Referring to FIG. 10B, when the second recording image 490a is displayed as a main image on the touch screen 190 of the master device 100, for example, the user makes a drag 540 using the finger to control photographing angle and/or direction of the slave device 300a.

For example, the first user may make the right-hand drag 540 to move the slave device 300a to the right. On the other hand, the first user may make a left-hand drag 540 to move the slave device 300a to the left. The first user may select a left-hand movement indicator (for example, a left-hand arrow) displayed on the touch screen 190 or input a voice command such as "move to the left" to the master device 100.

Referring to FIG. 10C, as the slave device 300a receives photographing control information from the master device 100, the photographing control information (for example, a left-hand arrow 545) may be displayed on the touch screen 390 of the slave device 300a.

Based on the photographing control information, the second user may move the slave device 300a to the left (to the left in view of the second user and upward in FIG. 10C) as indicated by 547.

FIG. 11A shows a photographing of the subject 500 according to an embodiment of the present disclosure.

Referring to FIG. 11B, when the second recording image 490a is displayed as a main image on the touch screen 190 of the master device 100, the user inputs a pinch or zoom-in action 550 using the fingers (that is, an action of moving two fingers apart in a state of touching the touch screen 190), thereby controlling photographing angle, direction, and/or position of the slave device 300a.

For example, the first user may take the zoom-in action 550 (that is, the action of moving the fingers apart in the touch state) to move the slave device 300a forward (that is, in a direction approaching the subject 500).

Referring to FIG. 11C, as the slave device 300a receives the photographing control information from the master device 100, the photographing control information (for example, an enlarge arrow 555) may be displayed on the touch screen 390 of the slave device 300a.

The second user may move the slave device 300a forward (that is, in a direction 557 approaching the subject 500) based on the photographing control information 555.

The slave device 300a may automatically perform a digital zoom-in operation based on the photographing control information 555, and transmit the zoomed-in real-time second recording image 490a to the master device 100.

In the current example, based on the photographing control information received from the master device 100, the slave device 300a may display information or perform a corresponding operation.

The master device 100 or the slave device 300a may select the photographing buttons 472 and 472a in the recording state to terminate group recording.

Figure 12A:
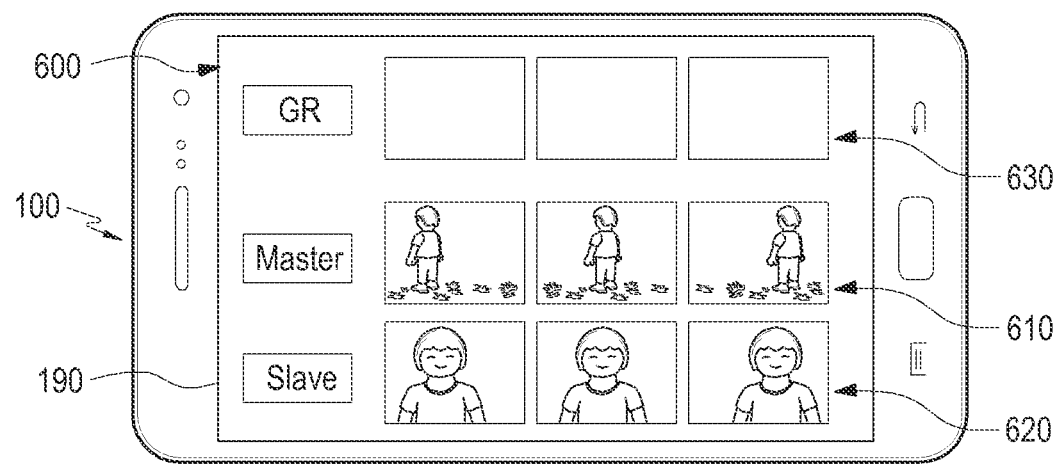
Figure 12B:
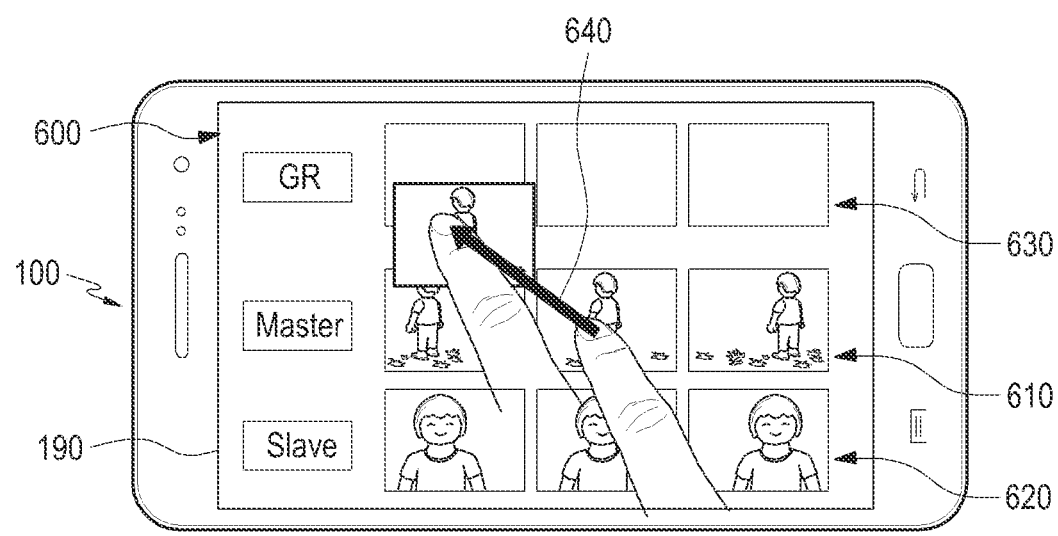

FIGS. 12A and 12B show an editing operation according to an embodiment of the present disclosure.

Referring to FIG. 12A, an edit screen 600 is displayed on the touch screen 190 of the master device 100 in response to an edit command of the first user or in response to termination of group recording.

On the edit screen 600, first recording images 610, second recording images 620, and empty frames 630 for a group recording file are displayed. The first recording images 610 and the second recording images 620 are synchronized on a time basis for display (that is, images corresponding to the same time or images corresponding to a predetermined time interval (for example, an interval of 1 second) are vertically aligned for display).

Referring to FIG. 12B, the first user may select desired images from among the first and second recording images 610 and 620 to form a group recording file.

For example, the first user may drag the first recording image 610 to the empty frame 630 for a group recording file, as indicated by 640.

Figure 13A:
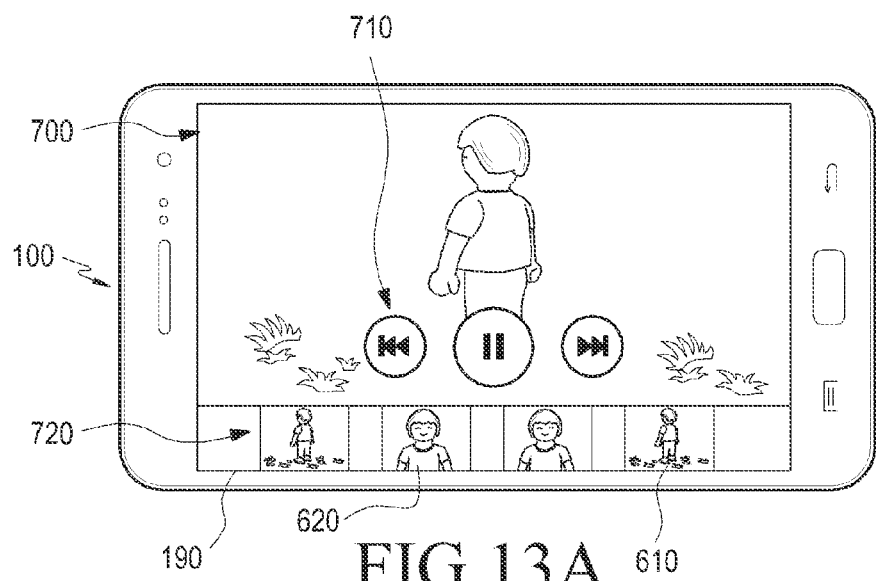
Figure 13B:
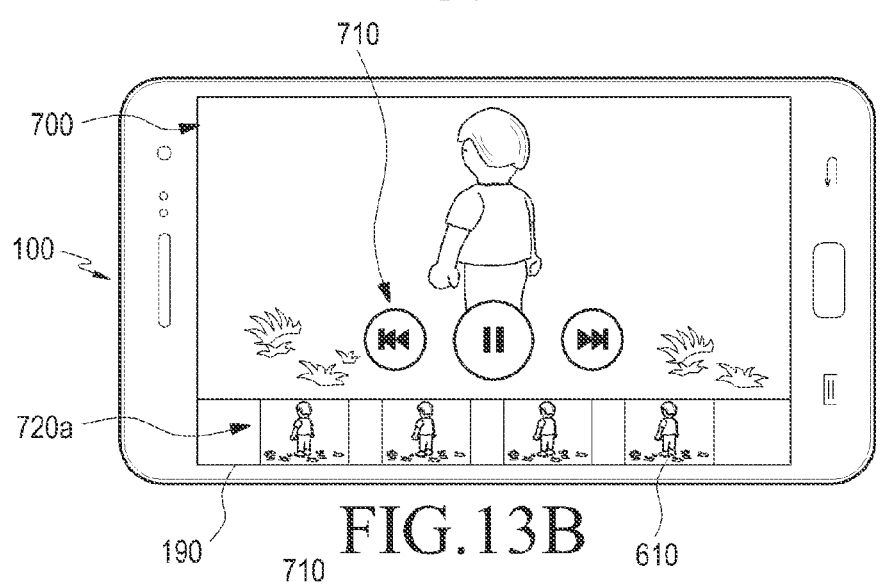
Figure 13C:
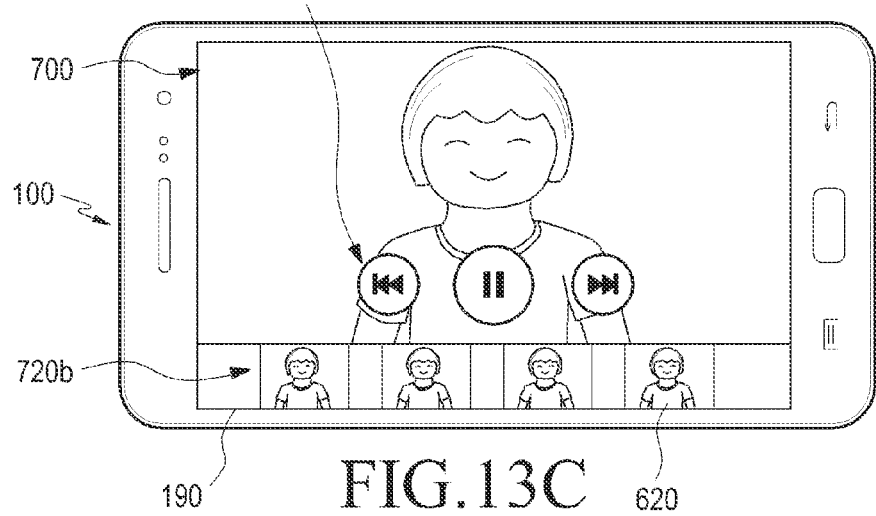

FIGS. 13A-13C show a playback operation according to an embodiment of the present disclosure.

Referring to FIG. 13A, the first user plays a group recording file. The group recording file is a file configured based on selection of the first user in which the first and second recording images 610 and 620 are arranged in a user-desired order. For example, buttons 710 for playback control, such as rewind, play/pause, fast forward, and so forth, may be overlappingly displayed on a group recording image 700.

As shown in main key images 720 in a lower part of the group recording image 700, the first and second recording images 610 and 620 are mixed in an order desired by the first user in the group recording file.

Referring to FIG. 13B, the first user plays the group recording file and the group recording file is configured to switch a screen based on selection of the first user. For example, the group recording file may be composed of the first and second recording images 610 and 620 that are not mixed. As can be seen in main key images 720a, the first recording images 610 are played prior to screen switch.

Referring to FIG. 13C, if the first user inputs a screen switch command during playback of the group recording file, screen switchover is performed from the first recording images 610 to the second recording images 620. As can be seen in main key images 720b, the second recording images 620 are played after screen switchover.

The screen switchover command may be input in various ways through the camera module 150, the input/output module 160, and the sensor module 170 as well as through the touch screen 190. For example, the first user may input the screen switchover command through the home button 161a, the volume button 161e, a voice command such as "switch the screen," and/or the like.

Figure 14:
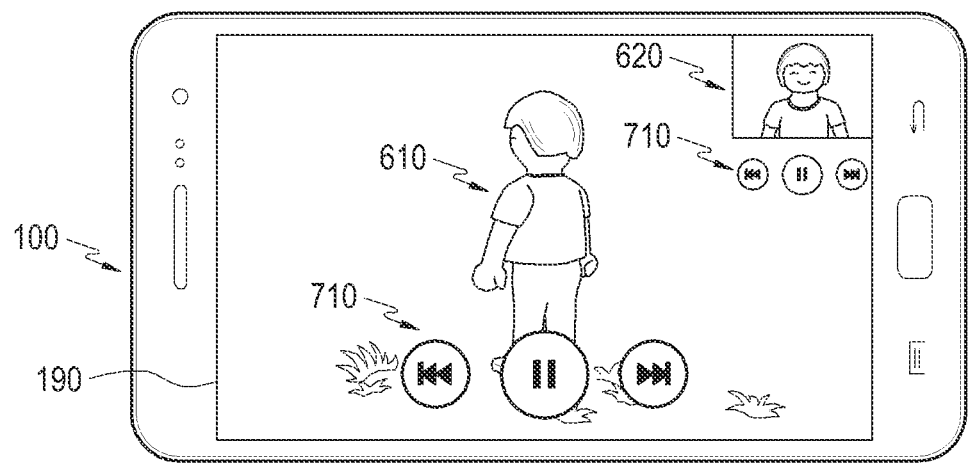

FIG. 14 shows a playback operation according to an embodiment of the present disclosure.

Referring to FIG. 14, the first user may play a group recording file, and the group recording file may be composed of the first and second recording images 610 and 620 that are not mixed. The first recording image 610 is displayed large as a main image, and the second recording image 620 is displayed small as a sub image in a predetermined position of the touch screen 190 (in an upper-right portion in FIG. 14). In a lower portion of each of the first recording image 610 and the second recording image 620, the buttons 710 for playback control, such as rewind, play/pause, fast forward, and so forth may be displayed. The buttons 710 for playback control may be displayed on the first recording image 610. The first user may switch the main image and the sub image to each other and move the sub image.

As stated above, the master device 100 may include as many codecs as the separate images 610 and 620 to process the separate images 610 and 620, respectively. The master device 100 may also include one codec capable of processing the separate images 610 and 620 in parallel.

Figure 15:
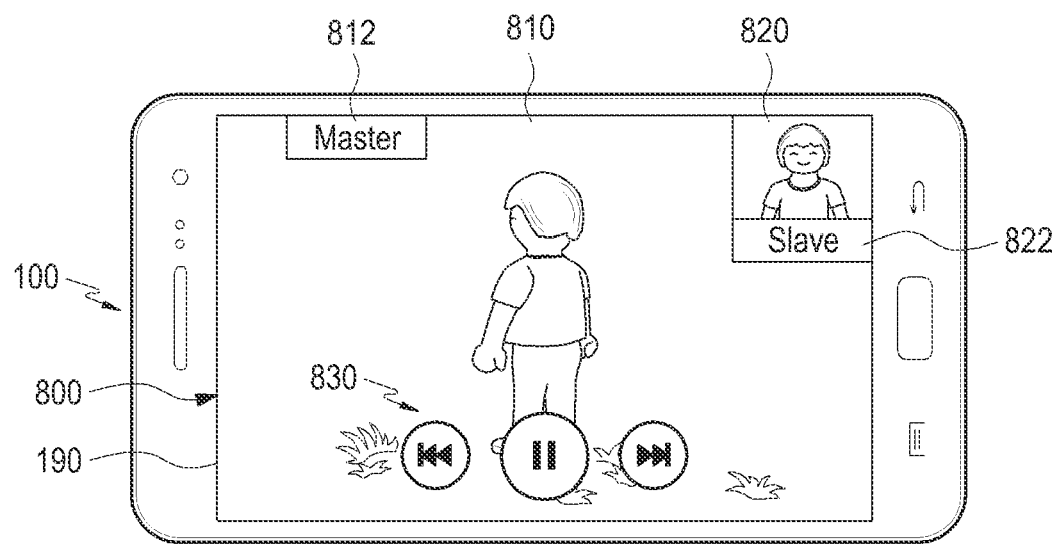

FIG. 15 shows a playback operation according to an embodiment of the present disclosure.

Referring to FIG. 15, the first user may play a group recording file, and the group recording file may be generated by capturing the screen displayed on the touch screen 190 during group recording as illustrated in FIG. 8B. That is, a group recording image 800 may include a first recording image 810 captured by the master device 100 and displayed as a main image and a second recording image 820 captured by the slave device 300a and displayed as a sub image. Selectively, the group recording image 800 may also include a master indicator 812 and a slave indicator 822. On the group recording image 800, buttons 830 for playback control may be displayed.

As is apparent from the foregoing description, group photographing from various viewpoints is possible, such that a plurality of users may be provided with a feeling of sharing as if they photograph the same object together and may obtain dynamic scenes with respect to the object.

In addition, according to the present disclosure, the user of the master device may select recording images captured by the master device and the slave device, respectively, on a time basis, and generate and store a group recording file composed of the selected images.

According to the present disclosure, the group recording file or the recording images of the master device may be shared with the slave device.

In the foregoing examples, a touch screen has been described as a representative example of a display unit for displaying a screen, but a general display unit or display unit, such as an LCD having no touch-sensing function, an OLED, an LED, and/or the like may be used instead of a touch screen.

It can be seen that the various embodiments of the present disclosure may be implemented with hardware, software, or a combination of hardware and software. Such arbitrary software may be stored, whether or not erasable or re-recordable, in a volatile or non-volatile storage such as ROM, a memory such as RAM, a memory chip, a device, or an integrated circuit, and an optically or magnetically recordable and machine (for example, computer)-readable storage medium such as a Compact Disc (CD), a Digital Versatile Disk (DVD), a magnetic disk, or a magnetic tape. It can be seen that a storing unit included in the electronic device is an example of a machine-readable storage medium which is suitable for storing a program or programs including instructions for implementing the various embodiments of the present disclosure. Therefore, the present disclosure includes a program including codes for implementing an apparatus or method claimed in an arbitrary claim and a machine (for example, computer)-readable storage medium for storing such a program. The program may be electronically transferred through an arbitrary medium such as a communication signal delivered through wired or wireless connection. The electronic device may receive and store the program from a program providing device connected in a wired or wireless manner. The program providing device may include a memory for storing a program including instructions for instructing the electronic device to execute the claimed group recording method, information necessary for the group recording method, a communication unit for performing wired or wireless communication with the electronic device, and a controller for transmitting a corresponding program to the electronic device at the request of the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A group recording method by an electronic device, the group recording method comprising:
   establishing a connection between the electronic device and at least one other electronic device through wireless communication;
   acquiring, by the electronic device, a first image created by photographing a target subject;
   receiving, by the electronic device, a second image created by photographing the target subject from the at least one other electronic device;
   transmitting, by the electronic device, photographing control information to the at least one other electronic device which is displaying a same image as the second image;
   receiving, from the at least one other electronic device by the electronic device, a third image created by photographing the target subject according to the photographing control information;
   storing, by the electronic device, the first image, the second image, and the third image; and
   displaying, by the electronic device, a combination of at least two from among the first image, the second image, and the third image together on a display of the electronic device, wherein the combination of the at least two from among the first image, the second image, and the third image displayed on the display is changed in response to a received touch gesture, wherein the photographing control information is generated in response to a touch gesture input on the second image displayed on the display, and the touch gesture input is for controlling a viewpoint of the at least one other electronic device, and wherein a first viewpoint corresponding to the first image, a second viewpoint corresponding to the second image, and a third viewpoint corresponding to the third image are different from each other.

2. The group recording method of claim 1, wherein the photographing control information comprises information about at least one of a photographing angle, a photographing direction, and a photographing position.

3. The group recording method of claim 1,
wherein the photographing control information comprises information about a direction of the touch gesture input.

4. The group recording method of claim 1, further comprising setting the electronic device as one of a master device and a slave device.

5. The group recording method of claim 1,
wherein the first image is displayed as a main image and the second image is displayed as a sub image having a smaller size than the main image, together on the display, and
wherein at least one of a position and the size of the sub image is changeable according to a user input.

6. The group recording method of claim 5, wherein the first image and the second image are used for screen switchover.

7. The group recording method of claim 6, wherein the screen switchover is performed when the second image is selected by input of the user.

8. The group recording method of claim 1, further comprising displaying a recording indicator indicating at the electronic device that the at least one other electronic device is in a recording state.

9. The group recording method of claim 1, further comprising executing a group recording application displayed on the electronic device.

10. The group recording method of claim 1, wherein the photographing of the target subject is initiated and terminated by selection of a photographing button.

11. The group recording method of claim 1, further comprising transmitting an image of the target subject photographed by the electronic device to the at least one other electronic device.

12. A non-transitory machine-readable storage medium having recorded thereon a program, which when executed, performs a method of group recording by an electronic device, the method comprising the steps of:
establishing a connection between the electronic device and at least one other electronic device through wireless communication;
acquiring, by the electronic device, a first image created by photographing a target subject;
receiving, by the electronic device, a second image created by photographing the target subject from the at least one other electronic device;
transmitting, by the electronic device, photographing control information to the at least one other electronic device which is displaying a same image as the second image;

receiving, from the at least one other electronic device by the electronic device, a third image created by photographing the target subject according the photographing control information;
storing, by the electronic device, the first image, the second image, and the third image; and
displaying, by the electronic device, a combination of at least two from among the first image, the second image, and the third image together on a display of the electronic device,
wherein the combination of the at least two from among the first image, the second image, and the third image displayed on the display is changed in response to a received touch gesture,
wherein the photographing control information is generated in response to a touch gesture input on the second image displayed on the display, and the touch gesture input is for controlling a viewpoint of the at least one other electronic device, and
wherein a first viewpoint corresponding to the first image, a second viewpoint corresponding to the second image, and a third viewpoint corresponding to the third image are different from each other.

13. An electronic device for group recording, the electronic device comprising:
a camera module configured to acquire a first image by photographing a target subject;
a communication module including at least one antenna;
a display; and
a controller configured to:
establish a connection with at least one other electronic device through the communication module,
receive a second image generated by photographing the target subject from the at least one other electronic device through the communication module,
transmit, through the communication module photographing control information to the at least one other electronic device which is displaying a same image as the second image,
receive, from the at least one other electronic device through the communication module, a third image created by photographing the target subject according to the photographing control information,
store the first image, the second image, and the third image,
display a combination of at least two from among the first image, the second image, and the third image together on the display,
wherein the combination of the first image, the second image, and the third image displayed on the display is changed in response to a received touch gesture,
wherein the photographing control information is generated in response to a touch gesture input on the second image displayed on the display, and the touch gesture input is for controlling a viewpoint of the at least one other electronic device, and
wherein a first viewpoint corresponding to the first image, a second viewpoint corresponding to the second image, and a third viewpoint corresponding to the third image are different from each other.

14. The electronic device of claim 13, wherein the photographing control information is in a form of instructions to a user of the at least one other electronic device.

15. The electronic device of claim 13, wherein the photographing control information comprises a controlling of a corresponding operation of the at least one other device.

16. The electronic device of claim 13, wherein the controller is further configured to generate a synchronized group recording file with the first image, the second image, and the third image.

17. The electronic device of claim 13,
wherein the first image is displayed as a main image and the second image is displayed as a sub image having a smaller size than the main image, together on the display, and
wherein at least one of a position and the size of the sub image is changeable according to a user input.

18. The electronic device of claim 13,
wherein each of the electronic device and the at least one other electronic device is configurable as a master device or a slave device, and
wherein a photographing operation of the slave device is controlled by the master device.

19. The non-transitory machine-readable storage medium of claim 12, wherein the photographing control information comprises information about at least one of a photographing angle, a photographing direction, and a photographing position.

20. The non-transitory machine-readable storage medium of claim 12, wherein the photographing control information comprises information about a direction of the touch gesture input.

\* \* \* \* \*